United States Patent
Palanki et al.

(10) Patent No.: US 9,009,573 B2
(45) Date of Patent: Apr. 14, 2015

(54) METHOD AND APPARATUS FOR FACILITATING CONCATENATED CODES FOR BEACON CHANNELS

(75) Inventors: Ravi Palanki, San Diego, CA (US); Naga Bhushan, San Diego, CA (US); Dexu Lin, San Diego, CA (US); Aamod D. Khandekar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1430 days.

(21) Appl. No.: 12/360,556

(22) Filed: Jan. 27, 2009

(65) Prior Publication Data

US 2009/0199069 A1 Aug. 6, 2009

Related U.S. Application Data

(60) Provisional application No. 61/025,666, filed on Feb. 1, 2008.

(51) Int. Cl.
*H03M 13/00* (2006.01)
*H04L 1/00* (2006.01)
*H04L 5/00* (2006.01)

(52) U.S. Cl.
CPC .......... *H04L 1/0065* (2013.01); *H04L 5/0053* (2013.01)

(58) Field of Classification Search
USPC ................................. 714/755, 774
See application file for complete search history.

(56) References Cited

U.S. PATENT DOCUMENTS

| | | | |
|---|---|---|---|
| 5,825,758 A | 10/1998 | Heikkinen et al. | |
| 5,828,962 A | 10/1998 | Ho-A-Chuck | |
| 5,867,478 A | 2/1999 | Baum et al. | |
| 5,920,862 A * | 7/1999 | Waters | 1/1 |
| 5,940,765 A | 8/1999 | Haartsen | |
| 5,970,414 A | 10/1999 | Bi et al. | |
| 6,337,988 B1 | 1/2002 | Agin et al. | |
| 6,473,619 B1 | 10/2002 | Kong et al. | |

(Continued)

FOREIGN PATENT DOCUMENTS

| | | |
|---|---|---|
| CN | 1219081 A | 6/1999 |
| CN | 1235745 | 11/1999 |

(Continued)

OTHER PUBLICATIONS

"High Performance Space Frequency Interleaved MIMO-OFDM Eigenmode Transmission Systems," Vehicular Technology Conference, 2006. VTC-2006 Fall. 2006 IEEE 64th, Sep. 25-28, 2006, pp. 1-5.*

(Continued)

*Primary Examiner* — Michael Maskulinski

(57) ABSTRACT

Methods, apparatuses, and computer program products are disclosed for encoding/decoding a wireless control signal. For encoding, control bits are received and encoded with a first error control code so as to create a first set of encoded bits. The encoded bits are then encoded with a second error control code so as to create a second set of encoded bits, which are modulated as beacon tones and subsequently transmitted. For decoding, beacon tones corresponding to a set of control bits are received and subsequently demodulated so as to ascertain a set of demodulated bits. The demodulated bits are then decoded with a decoder so as to ascertain a set of decoded bits. The decoded bits are then decoded with a second decoder so as to ascertain a second set of decoded bits, which includes the set of control bits.

20 Claims, 19 Drawing Sheets

(56) References Cited

U.S. PATENT DOCUMENTS

| | | | |
|---|---|---|---|
| 6,498,932 | B1 | 12/2002 | Silventoinen et al. |
| 6,728,550 | B1 | 4/2004 | Boehnke et al. |
| 6,795,419 | B2 | 9/2004 | Parantainen et al. |
| 7,302,276 | B2 | 11/2007 | Bernhardsson et al. |
| 7,426,395 | B2 | 9/2008 | Stephens |
| 7,450,559 | B2 | 11/2008 | Schotten et al. |
| 7,522,919 | B2 | 4/2009 | Yoon et al. |
| 7,555,300 | B2 | 6/2009 | Scheinert et al. |
| 7,657,277 | B2 * | 2/2010 | Montojo et al. ............. 455/522 |
| 7,751,510 | B2 | 7/2010 | Budianu et al. |
| 7,796,639 | B2 | 9/2010 | Buckley et al. |
| 7,830,907 | B1 | 11/2010 | Petranovich et al. |
| 7,920,494 | B2 | 4/2011 | Stewart et al. |
| 8,077,649 | B2 | 12/2011 | Cai |
| 8,077,801 | B2 | 12/2011 | Malladi |
| 2001/0001609 | A1 | 5/2001 | Mikuni et al. |
| 2001/0014608 | A1 | 8/2001 | Backstrom et al. |
| 2002/0168994 | A1 | 11/2002 | Terry et al. |
| 2003/0101404 | A1 * | 5/2003 | Zhao et al. ............... 714/755 |
| 2003/0119452 | A1 | 6/2003 | Kim et al. |
| 2004/0022176 | A1 * | 2/2004 | Hashimoto et al. ........... 370/204 |
| 2004/0190482 | A1 | 9/2004 | Baum et al. |
| 2004/0198235 | A1 | 10/2004 | Sano |
| 2004/0203734 | A1 | 10/2004 | Ishii |
| 2005/0163070 | A1 | 7/2005 | Farnham et al. |
| 2005/0233746 | A1 * | 10/2005 | Laroia et al. ................. 455/436 |
| 2005/0254555 | A1 | 11/2005 | Teague et al. |
| 2005/0277425 | A1 | 12/2005 | Niemela et al. |
| 2006/0045050 | A1 | 3/2006 | Floros et al. |
| 2006/0111137 | A1 | 5/2006 | Mori et al. |
| 2006/0281476 | A1 | 12/2006 | Lane et al. |
| 2006/0286995 | A1 | 12/2006 | Onggosanusi et al. |
| 2007/0021075 | A1 * | 1/2007 | Nakao ............................ 455/101 |
| 2007/0036066 | A1 | 2/2007 | Thomas et al. |
| 2007/0047483 | A1 | 3/2007 | Khan |
| 2007/0070967 | A1 | 3/2007 | Yang et al. |
| 2007/0082619 | A1 | 4/2007 | Zhang et al. |
| 2007/0104151 | A1 | 5/2007 | Papasakellariou et al. |
| 2007/0167160 | A1 | 7/2007 | Asanuma et al. |
| 2007/0189244 | A1 | 8/2007 | Del et al. |
| 2007/0195899 | A1 | 8/2007 | Bhushan et al. |
| 2007/0202913 | A1 | 8/2007 | Ban |
| 2007/0242618 | A1 * | 10/2007 | Sakoda et al. ................ 370/252 |
| 2007/0248113 | A1 | 10/2007 | Ko et al. |
| 2007/0253442 | A1 | 11/2007 | Yu et al. |
| 2007/0258357 | A1 | 11/2007 | Akita |
| 2007/0275746 | A1 | 11/2007 | Bitran |
| 2008/0031307 | A1 | 2/2008 | Fukuoka et al. |
| 2008/0032744 | A1 | 2/2008 | Khan et al. |
| 2008/0049690 | A1 | 2/2008 | Kuchibhotla et al. |
| 2008/0056201 | A1 * | 3/2008 | Bennett ........................ 370/334 |
| 2008/0081598 | A1 | 4/2008 | Chandra et al. |
| 2008/0095133 | A1 | 4/2008 | Kodo et al. |
| 2008/0130612 | A1 | 6/2008 | Gorokhov et al. |
| 2008/0132263 | A1 | 6/2008 | Yu et al. |
| 2008/0144612 | A1 | 6/2008 | Honkasalo et al. |
| 2008/0232396 | A1 | 9/2008 | Buckley et al. |
| 2009/0052403 | A1 | 2/2009 | Hokao |
| 2009/0080382 | A1 | 3/2009 | Chen et al. |
| 2009/0097447 | A1 | 4/2009 | Han et al. |
| 2009/0129268 | A1 | 5/2009 | Lin et al. |
| 2009/0130979 | A1 | 5/2009 | Bhushan et al. |
| 2009/0131061 | A1 | 5/2009 | Palanki et al. |
| 2009/0149187 | A1 | 6/2009 | Miki et al. |
| 2009/0185632 | A1 | 7/2009 | Cai et al. |
| 2009/0219838 | A1 * | 9/2009 | Jia et al. ..................... 370/278 |
| 2009/0219839 | A1 | 9/2009 | Zhao et al. |
| 2009/0252077 | A1 | 10/2009 | Khandekar et al. |
| 2009/0257388 | A1 | 10/2009 | Khandekar et al. |
| 2010/0009687 | A1 | 1/2010 | Koivisto et al. |
| 2010/0014286 | A1 | 1/2010 | Yoneda et al. |
| 2010/0062783 | A1 | 3/2010 | Luo et al. |
| 2010/0091702 | A1 * | 4/2010 | Luo et al. ................... 370/328 |
| 2010/0097972 | A1 | 4/2010 | Parkvall et al. |
| 2010/0201188 | A1 | 8/2010 | Robbins |
| 2010/0329171 | A1 | 12/2010 | Kuo et al. |
| 2011/0103286 | A1 | 5/2011 | Montojo et al. |
| 2011/0103338 | A1 | 5/2011 | Astely et al. |
| 2011/0235744 | A1 * | 9/2011 | Ketchum et al. .............. 375/295 |

FOREIGN PATENT DOCUMENTS

| | | |
|---|---|---|
| CN | 1685647 A | 10/2005 |
| CN | 1770892 A | 5/2006 |
| CN | 1909417 A | 2/2007 |
| CN | 1998146 A | 7/2007 |
| CN | 101094433 A | 12/2007 |
| EP | 0917305 A2 | 5/1999 |
| EP | 1061705 A1 | 12/2000 |
| EP | 1420551 A2 | 5/2004 |
| EP | 1440532 | 7/2004 |
| EP | 1501328 A2 | 1/2005 |
| EP | 1679814 A2 | 7/2006 |
| JP | 11098571 A | 4/1999 |
| JP | 2004260692 A | 9/2004 |
| JP | 2004274745 A | 9/2004 |
| JP | 2005510902 | 4/2005 |
| JP | 2006505978 A | 2/2006 |
| JP | 2006135673 A | 5/2006 |
| JP | 2006311465 A | 11/2006 |
| JP | 2007053438 A | 3/2007 |
| JP | 2007097173 A | 4/2007 |
| JP | 2007129726 A | 5/2007 |
| JP | 2007515106 A | 6/2007 |
| JP | 2007221745 A | 8/2007 |
| JP | 2007251855 A | 9/2007 |
| JP | 2007527678 A | 9/2007 |
| JP | 2007529915 A | 10/2007 |
| JP | 2007300453 A | 11/2007 |
| JP | 2007533255 | 11/2007 |
| JP | 2007335913 A | 12/2007 |
| JP | 2007538462 T | 12/2007 |
| JP | 2008053858 A | 3/2008 |
| JP | 2008219637 A | 9/2008 |
| JP | 2008288736 A | 11/2008 |
| JP | 2008547269 A | 12/2008 |
| JP | 2009510975 A | 3/2009 |
| JP | 2009246501 A | 10/2009 |
| JP | 2009538584 A | 11/2009 |
| KR | 2007009707 A | 1/2007 |
| RU | 2150176 | 5/2000 |
| RU | 2165678 C2 | 4/2001 |
| RU | 2216103 C2 | 11/2003 |
| RU | 2002129901 A | 3/2004 |
| RU | 2236757 C2 | 9/2004 |
| RU | 2262811 | 10/2005 |
| RU | 2287902 C2 | 11/2006 |
| RU | 2307481 C2 | 9/2007 |
| TW | 200404467 | 3/2004 |
| TW | 200404472 | 3/2004 |
| WO | WO96016524 | 5/1996 |
| WO | 9809469 A1 | 3/1998 |
| WO | WO-0013426 A2 | 3/2000 |
| WO | WO0135692 A1 | 5/2001 |
| WO | WO0178440 | 10/2001 |
| WO | WO03039057 | 5/2003 |
| WO | 03101141 A1 | 12/2003 |
| WO | WO2004019537 A2 | 3/2004 |
| WO | WO-2004043096 A2 | 5/2004 |
| WO | 2005088873 A1 | 9/2005 |
| WO | WO2005109657 A1 | 11/2005 |
| WO | WO2005117283 A2 | 12/2005 |
| WO | WO2006001143 A1 | 1/2006 |
| WO | WO2006007318 A1 | 1/2006 |
| WO | WO2006020032 | 2/2006 |
| WO | WO2006038694 A1 | 4/2006 |
| WO | WO2006043588 A1 | 4/2006 |
| WO | 2006086437 A1 | 8/2006 |
| WO | 2006106676 A1 | 10/2006 |
| WO | 2006138336 A1 | 12/2006 |
| WO | WO2006134032 | 12/2006 |
| WO | 2007024853 | 3/2007 |
| WO | WO2007024895 A2 | 3/2007 |
| WO | WO2007025308 | 3/2007 |

(56) References Cited

FOREIGN PATENT DOCUMENTS

| WO | 2007044173 A2 | 4/2007 |
|---|---|---|
| WO | WO2007044281 | 4/2007 |
| WO | 2007081130 A1 | 7/2007 |
| WO | WO2007091245 A2 | 8/2007 |
| WO | WO2007106980 | 9/2007 |
| WO | 2007119452 A1 | 10/2007 |
| WO | 2007137201 | 11/2007 |
| WO | 2007137920 A1 | 12/2007 |
| WO | 2008023928 A2 | 2/2008 |
| WO | WO2008049136 | 4/2008 |
| WO | WO2008086149 | 7/2008 |

OTHER PUBLICATIONS

"Update on out-of-band pilot design for LBC FDD," Ravi Palanki. ftp://ftp.3gpp2.org/TSGC/Working/2006/2006-12-Maui/TSG-C-2006-12-Maui/WG3/C30-20061204-045_QCOM_update_on_out-of-band_pilot_design_for_LBC_FDD.pdf, Dec. 2006.*

3GPP: "3rd Generation Partnership Project; Technical Specification Group Radio Access network; Evolved Universal Terrestrial Radio access (E-UTRA); Physical channels and Modulation (Release 8)" Internet, Citation, Mar. 2008, sections 6-6.2.4 and 6.10 to 6.10.3.2, pp. 1-65, XP002537575.

Hooli K, et al., "Flexible Spectrum Use between Winner Radio Access Networks" Proc. IST Mobile & Wireless, Myconos (Greece), Jun. 4, 2006, pp. 1-5, XP003020776 p. 1, paragraph 1, p. 2, paragraph 2.

International Search Report and Written Opinion—PCT/US2009/032284, International Search Authority—European Patent Office—Nov. 16, 2009.

LG Electronics: "Multiplexing of MBMS and unicast transmission in E-UTRA downlink; R1-060054" 3GPP TSG-RAN WG1 Meeting Ad Hoc LTE, vol. R1-060054, Jan. 23, 2006, pp. 1-5, XP003016637.

NTT Docomo et al., "L1/L2 Control Channel Structure for E-UTRA Downlink," 3GPP TSG RAN WG1 Meeting 45, R1-061181, Shanghai, China, May 8-12, 2006, pp. 1-17.

NTT Docomo et al., "PUCCH Structure Considering Sounding RS Transmission in E-UTRA Uplink," 3GPP TSG RAN WG1 Meeting #50, R1-073700, Athens, Greece, Aug. 20-24, 2007, pp. 1-3.

Qualcomm Europe: "Neighbor Cell Search—Analysis and Simulations" 3GPP Draft; R1-063432, 3rd Generation Partnership Project (36PP), Mobile Competence Centre ; 650, Route Des Lucioles ; F-06921 Sophia-Antipolis Cedex ; France, no. Riga, Latvia; 20061106, Nov. 1, 2006, XP050103869 paragraph [04.1]-paragraph [04.3].

Taiwan Search Report—TW098103291—TIPO—Jul. 10, 2012.

3rd Generation Partnership Project; Technical Specification Group Radio Access Network; Multiplexing and channel coding (FDD); 3GPP TS 25.212 V5.10.0 (Jun. 2005) Release 5.

NEC Group: "Some issues related to MBSFN sub-frame structure", R1-071501, RAN WG1 meeting 48bis, Mar. 30, 2007, http://www.3gpp.org/ftp/tsg_ran/VVG1_RL1/TSGR1_48b/Docs/R1-071501.zip.

LG Electronics: "DL PDCCH/PCFICH/RS transmission in MBSFN subframe," R1-073477, 3GPP TSG RAN WG1 #50,7.2.3, Aug. 20-24, 2007, pp. 2.

Nokia et al: "Issues regarding MBSFN subframes", 3GPP Draft; R1-074863, 3rd Generation Partnership Project (3GPP), Mobile Competence Centre ; 658, Route Des Lucioles , F-06921 Sophia-Antipolis Cedex; France, vol. Ran WG1, No. Korea; 20071030, Oct. 30, 2007, XP050108319.

3GPP TS 36.211, V8.2.0 (Mar. 2008), 3rd Generation Partnership Project; Technical Specification Group Radio Access Network; Evolved Universal Terrestrial Radio Access (E-UTRA); Physical Channels and Modulation (Release 8), Mar. 2008, http://www.3gpp.org/ftp/Specs/archive/36_series/36.211/36211-820.zip.

* cited by examiner

METHOD AND APPARATUS FOR FACILITATING CONCATENATED CODES FOR BEACON CHANNELS

CROSS-REFERENCE TO RELATED APPLICATIONS

This application claims the benefit of U.S. Provisional Patent application Ser. No. 61/025,666 entitled "METHOD AND APPARATUS FOR CODING CONTROL INFORMATION IN WIRELESS COMMUNICATIONS," which was filed Feb. 1, 2008. This application is also related to co-pending U.S. patent application Ser. No. 12/163,812 (Docket No. 080266) entitled, "BEACON-BASED CONTROL CHANNELS," which was filed on Jun. 27, 2008. The entirety of the aforementioned applications are herein incorporated by reference.

BACKGROUND

I. Field

The following description relates generally to wireless communications, and more particularly to methods and apparatuses for coding control information.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), High Speed Packet (HSPA, HSPA+), and others. Moreover, wireless communication systems can be designed to implement one or more standards, such as IS-95, CDMA2000, IS-856, W-CDMA, TD-SCDMA, and the like.

In designing a reliable wireless communication system, special attention must be given to particular data transmission parameters. For instance, in a densely deployed network, where the spectrum is reused by different sectors and the coverage areas of these sectors overlap, signals may collide frequently due to different transmitters simultaneously accessing the same spectrum, which causes significant interference. For example, consider a wireless system with a transmitter TX_A and a receiver RX_A. The transmitter TX_A may be a sector or a base station. The receiver RX_A may be a mobile station or a relay station (Alternately, the transmitter TX_A may be a mobile station and the receiver RX_A may be a base station). The transmitter TX_A typically transmits a combination of data channels and control channels to RX_A and other receivers. The control channels may include, but are not limited to, acknowledgement channels, power control channels, resource assignment channels. etc.

In some cases, the interference caused by TX_B may be very high, thereby degrading the signal-to-noise ratio at RX_A to a point where it is unable to receive its control channels from TX_A. Such high interference levels are common in wireless technologies where the deployments are unplanned. Examples could include femtocell deployments, WiFi deployments etc. The problem is especially acute in systems with "restricted association" where a receiver is not allowed to connect to the strongest RF link. For example, a WiFi user may not be able to connect to his/her neighbor's WiFi Access Point even if the signal strength from the neighbor's access point is significantly higher than that of his/her own access point.

A common strategy to deal with such high interference levels is interference avoidance. In this case, TX_A and TX_B may be instructed to transmit in different time or frequency slots so that TX_B no longer interferes with TX_A. However, if either of TX_A or TX_B is in an area such that the signal-to-noise ratio is poor, receiving control data that includes such interference avoidance information may itself be difficult. Accordingly, it would be desirable to have a method and apparatus for robustly encoding/decoding control data transmitted within a noisy wireless environment.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating concatenated codes for beacon channels. In an aspect, beacon-based signaling is disclosed as having particularly desirable characteristics for transmitting data within a noisy wireless environment, wherein concatenating error control codes facilitates transmitting such beacon-based signals more accurately and efficiently.

In one aspect, a method, apparatus, and computer program product is disclosed for encoding a wireless control signal. Within such embodiment, a set of information bits are received and encoded with a first error control code so as to create a first set of encoded bits. The first set of encoded bits is then encoded with a second error control code so as to create a second set of encoded bits. The second set of encoded bits is then modulated as beacon tones and subsequently transmitted to a receiving unit.

In another aspect, a method, apparatus, and computer program product is disclosed for decoding a wireless control signal. Within such embodiment, beacon tones corresponding to a set of control bits are received and subsequently demodulated so as to ascertain a set of demodulated bits. The demodulated bits are then decoded with a first error control decoder so as to ascertain a first set of decoded bits. The first set of decoded bits are then decoded with a second error control decoder so as to ascertain a second set of decoded bits, which includes the set of control bits.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
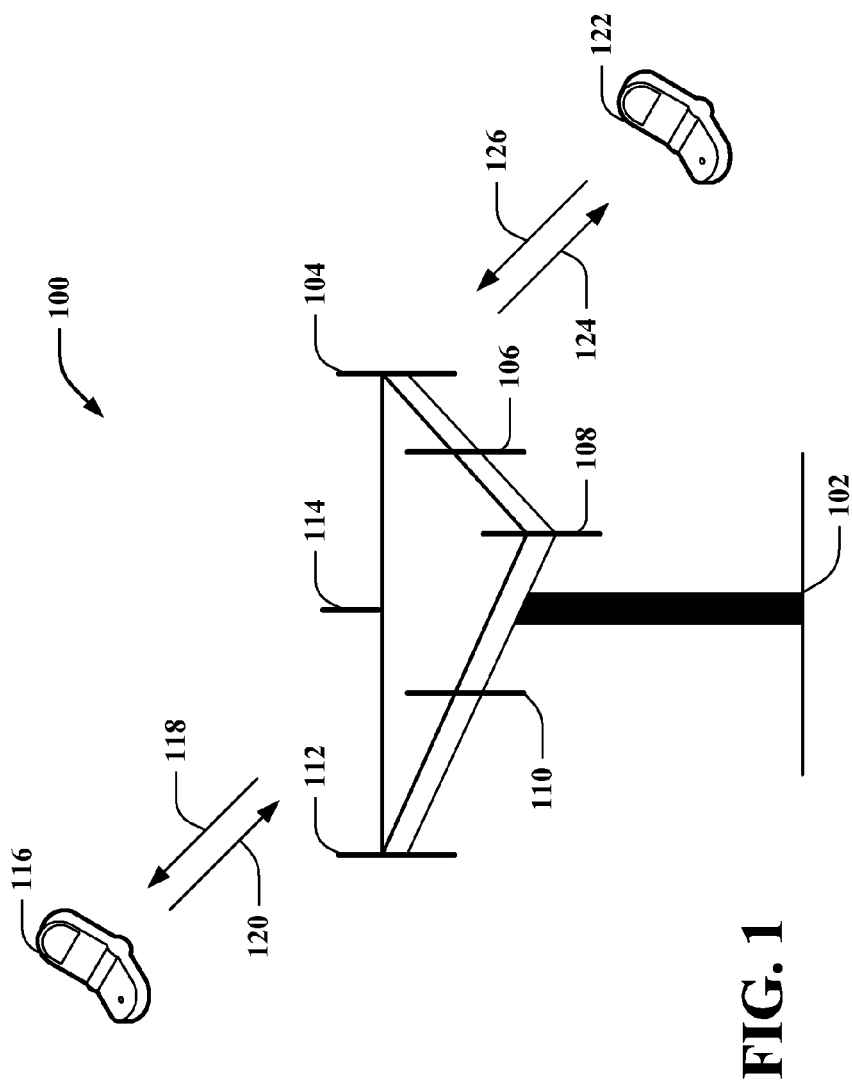
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications.

Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
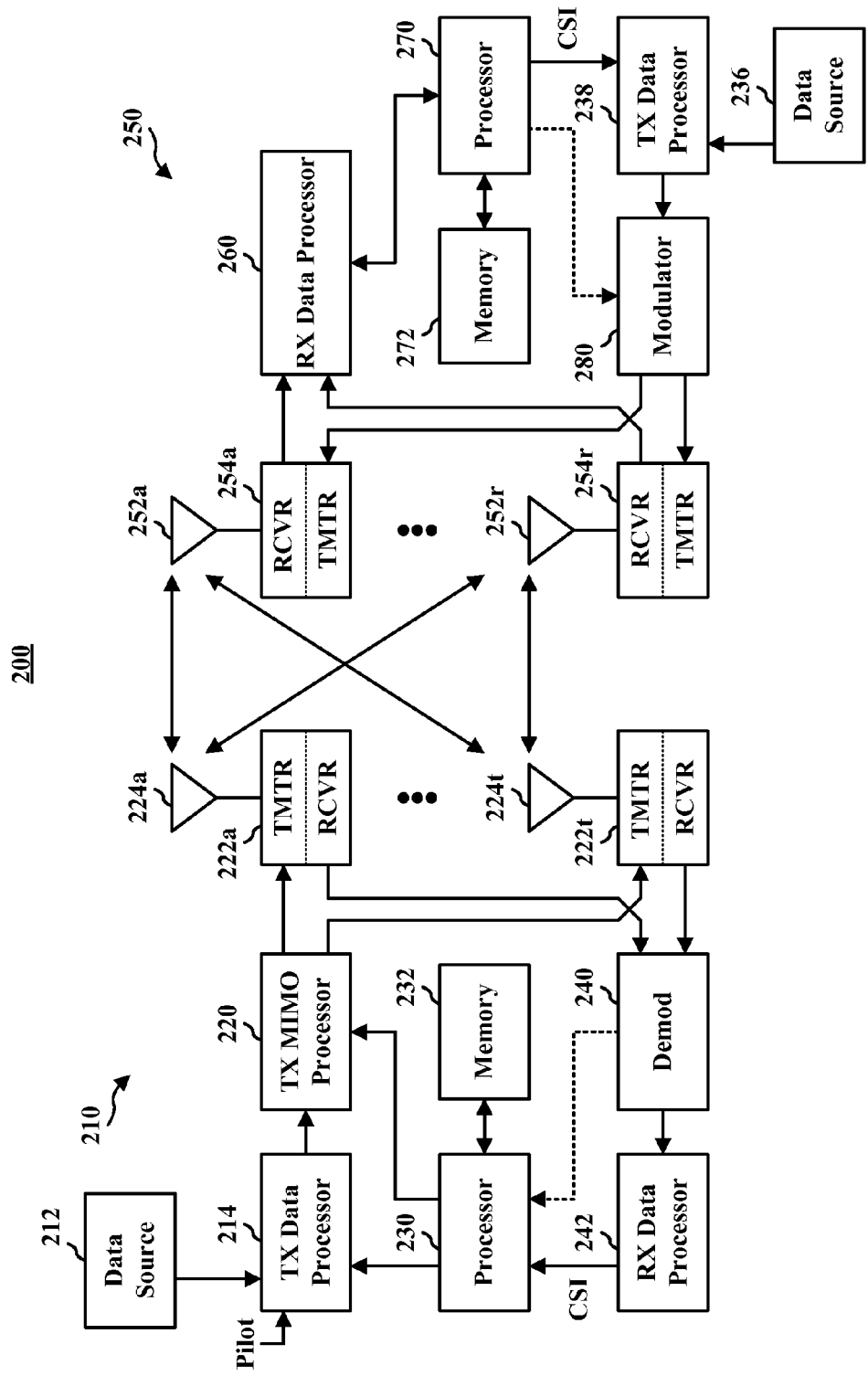
FIG. 2 is an illustration of an example wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g. control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

In some aspects of the present disclosure, beacons are used to transmit control channels (including, but not limited to, interference avoidance messages). In a conventional OFDMA system, a beacon OFDM symbol (or simply a beacon) may be an OFDM symbol in which a large fraction (possibly all) of the power is transmitted on one subcarrier, referred to as the beacon subcarrier. Since a large amount of energy is transmitted on this subcarrier, it is easy to detect even at low signal-to-noise ratios (SNRs). Therefore, beacons provide a very useful mechanism of signaling a small number of bits to receivers at very low SNRs. For example, a sequence of beacons may be used to signal the SectorID of a given sector. The subcarriers modulated in the aforementioned sequence may vary from one beacon symbol to the next.

One result of using beacons in scenarios with dominant interferers is that the signal strength of the dominant interferer no longer matters as the dominant interferer's beacons occupy different subcarriers with a high probability. Therefore beacons are a desirable method of transmitting control channels, including interference avoidance messages.

In an aspect of the present disclosure, not all of the power in an OFDM symbol need be used up. For example, a beacon segment, which is a subset of all available subcarriers, may be allocated for beacon transmission. In this subsegment, a receiver RX_A may transmit a beacon sequence requesting that interference be cleared up. Upon decoding the beacon sequence, the neighboring transmitters may decide whether or not to remain silent for a period of time to reduce interference for RX_A. The beacon segment may be common to all sectors in the deployment.

In some aspects, a beacon segment may co-exist with existing data transmission of certain transmitters or can be on a cleared segment dedicated for beacon signaling. In one example, a beacon segment may be used by macrocells for data transmission, while femtocells use it for interference avoidance message transmission. The size of the segment may vary from across different sector classes.

The presence of a beacon within the beacon segment is identified based on their higher signal strength relative to other subcarriers. The encoded information may be carried in the position of the beacons. Interference estimation may be performed to estimate the background interference level such that a threshold can be set to identify the presence of a beacon symbol. For example, if the power on a subcarrier is P and the estimated interference level is I, then a subcarrier is considered to contain a beacon if P/I>=T and not to contain a beacon otherwise, where T is the threshold value.

Figure 3:
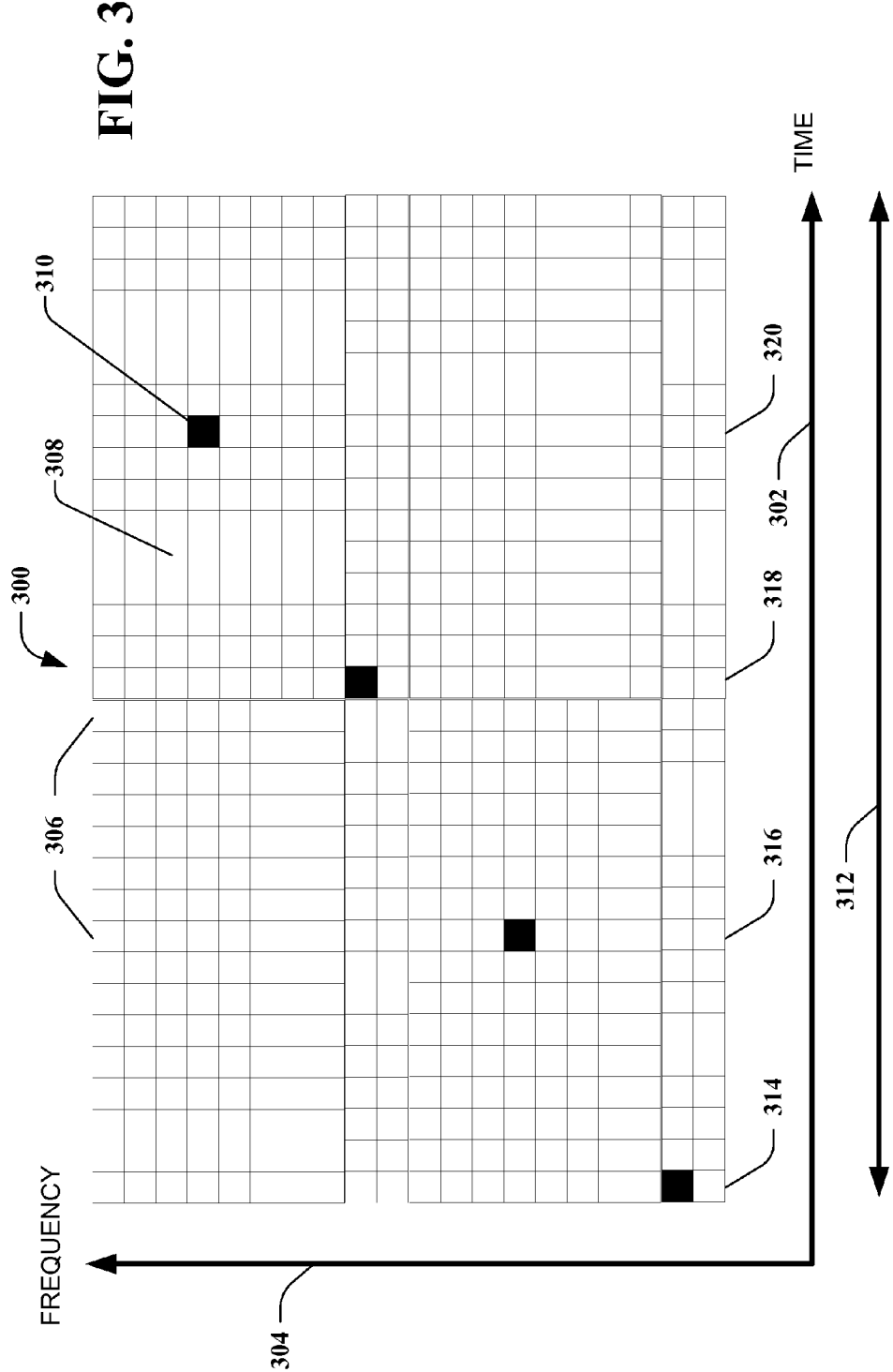
FIG. 3 illustrates a beacon signal in accordance with some aspects.

Turning to FIG. 3, illustrated is a beacon signal 300 in an example Orthogonal Frequency-Division Multiplexing (OFDM) system in accordance with the various aspects described herein. The first and second (or more) subsets of broadcast information can be transported using a special signal or signaling scheme, referred to as a beacon signal.

The horizontal axis 302 represents time and the vertical axis 304 represents frequency. A vertical column represents an OFDM symbol (or a segment of subcarriers within an OFDM symbol), wherein each OFDM symbol contains multiple tones separated in frequency. Each small box, such as box 308, represents a tone-symbol, which is a degree of freedom in an OFDM symbol.

Beacon signal 300 includes a sequence of beacon signal bursts, which are transmitted sequentially over time. A beacon signal burst includes one or more (e.g., a small number) beacon symbols. Each beacon symbol can be a signal transmitted in one degree of freedom with much higher transmission power than the average per degree of freedom transmission power over a relatively large time interval.

Illustrated are four small black boxes 310, each of which represents a beacon signal symbol. The transmission power of each beacon signal symbol is much higher (e.g., at least about 10 or 15 dB higher) than the average per tone symbol transmission power over the time interval 312. Each OFDM symbol 314, 316, 318, 320 includes a beacon signal burst. In this illustration, each beacon signal burst includes one beacon symbol 310 over one transmission symbol period 306, wherein the time interval 312 includes four transmission symbol periods 306.

Figure 4:
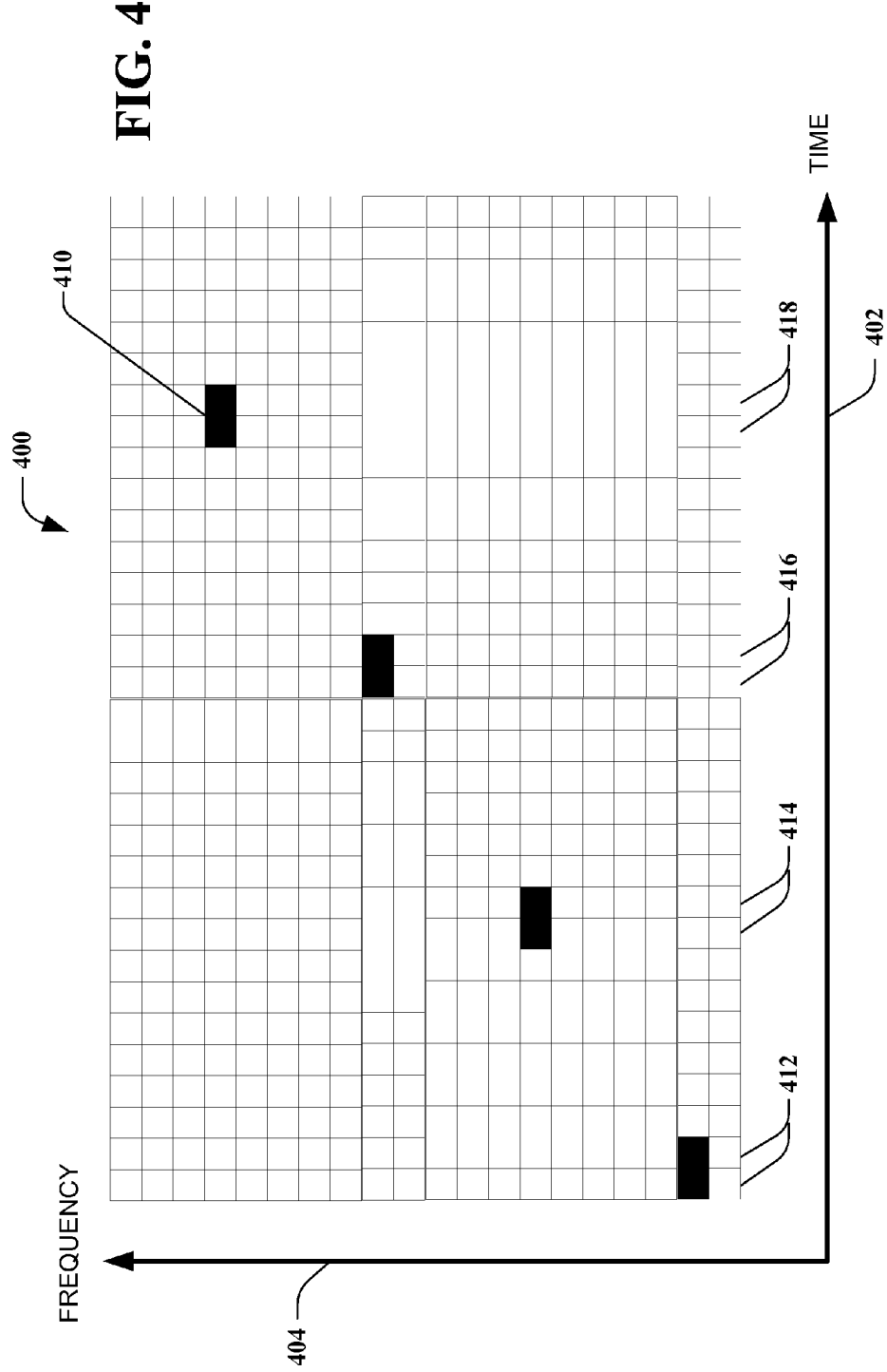
FIG. 4 illustrates another beacon signal that can be utilized with one or more of the disclosed examples.

FIG. 4 illustrates another beacon signal 400 that can be utilized with one or more of the disclosed examples. Beacon signal 400 is similar to beacon signal 300 of the above figure. The difference between these two beacon signals 300, 400 is that beacon signal 400 includes two beacon symbols 410 of the same single tone over two consecutive OFDM symbols. In particular, a beacon signal burst includes two consecutive OFDM symbols 412, 414, 416, 418. In general, in an asynchronous network, the reception of beacon sequences may be improved by repeating each OFDM symbol a number of times at the transmitter.

Figure 5:
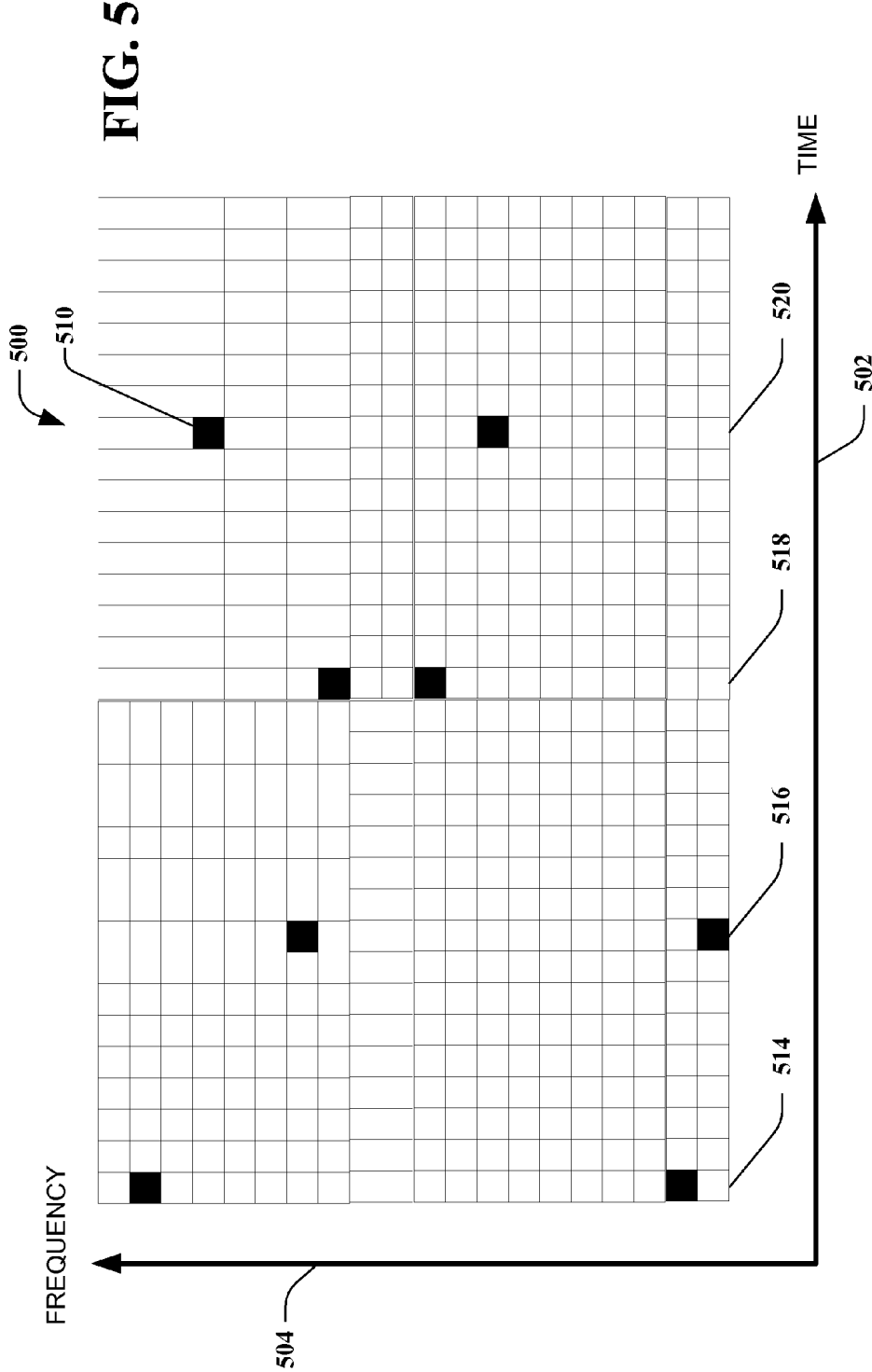
FIG. 5 illustrates yet another beacon that can be utilized with one or more of the disclosed examples.

FIG. 5 illustrates yet another beacon signal 500 that can be utilized with one or more of the disclosed examples. This beacon signal 500 is similar to the above beacons signals 300, 400. The difference is that in this beacon signal 500, multiple beacon symbols are included over a single OFDM symbol. In particular, for this illustration, pairs of beacon symbols 510 are included over each of OFDM symbols 514, 516, 518, and 520.

To overcome the effect of erroneously-identified beacons, error control coding can be used to protect the beacons, such that the information bits carried by the beacons can be decoded in the presence of interference and noise. One way to encode the beacon sequences is to use Reed-Solomon codes. In an aspect, Reed-Solomon codes convert the original beacon sequence of length K, which carries a certain number of control information bits, to a new sequence of length N (N>K). Within such embodiment, the introduced redundancy may serve at least two purposes. First, it helps to guard against noise and interference, such that even when some of the received beacons are erroneous, the correct information may be recovered. And second, it helps to separate multiple beacon sequences transmitted concurrently (an operation called "disambiguation"), where the redundancy helps the decoder to determine which combinations of the received beacons form valid codewords (and hence carry encoded information).

In some aspects of the present disclosure, the same Reed-Solomon code can be used by all sectors (or mobiles). In such a case, the SectorID or a time-varying hash of the SectorID can be included in the encoded message to help mobiles distinguish between different sectors. Alternately, different sectors may use different codes. One option is to utilize a scrambled RS code where a given Reed-Solomon codeword is multiplied by a sector-specific sequence over the alphabet of interest. The scrambled codeword is then used to pick the locations of beacons in the beacon segment. Here, although this description pertains to forward link, it should be appreciated that similar codes can be applied to the reverse link as well.

To enhance the performance of the decoding and disambiguation of beacon sequences, soft information of the detected beacons may be utilized. This includes the values of the power and phase of beacon tones, as well as the signal strength ranking of all the subcarriers.

For particular applications, however, a more sophisticated encoding scheme may be desirable. For instance, in some applications, it may be desirable to increase the number of control bits a beacon codeword can carry. Generally, the alphabet size (Q) and the number of information symbols (K) determine the number of control bits each beacon codeword carries. However, increasing the values of Q and K too much may require a prohibitively complex decoding scheme, which in turn means that the number of control bits each beacon codeword can carry is limited.

For other applications, a more sophisticated encoding scheme may also be desired so as to reduce the probability of a false alarm. Moreover, although a beacon decoding algorithm may be designed targeting a certain false alarm probability, it is possible that some beacon sequences require a significantly smaller false alarm probability than others. For instance, transmission of a control message that is "sticky" may be needed, wherein the message tries to clear interlaces or blank the control segment for a relatively long period of time. Since a false alarm of such a message would be very costly, it would be desirable to encode particularly sensitive messages to have a much lower false alarm probability relative to other less-sensitive control messages.

In an aspect, properly designed concatenated codes are provided to significantly increase the number of control bits and reduce the false alarm probability for beacon messages. Moreover, instead of a single layer of coding (e.g., the Reed-Solomon codes), the concatenated code design encodes the control bits with an outer code followed by an inner code before the encoded symbols are modulated as beacons. The inner code and the outer code can be different codes or the same code, chosen from the set of the available error control codes. One of the options is to keep the inner code identical to the aforementioned single-layer design (such as using the Reed-Solomon code) and focus on the design of the outer code (i.e., the second encoding layer). Such a design may be advantageous in that the beacon disambiguation algorithm remains unchanged.

Figure 6:
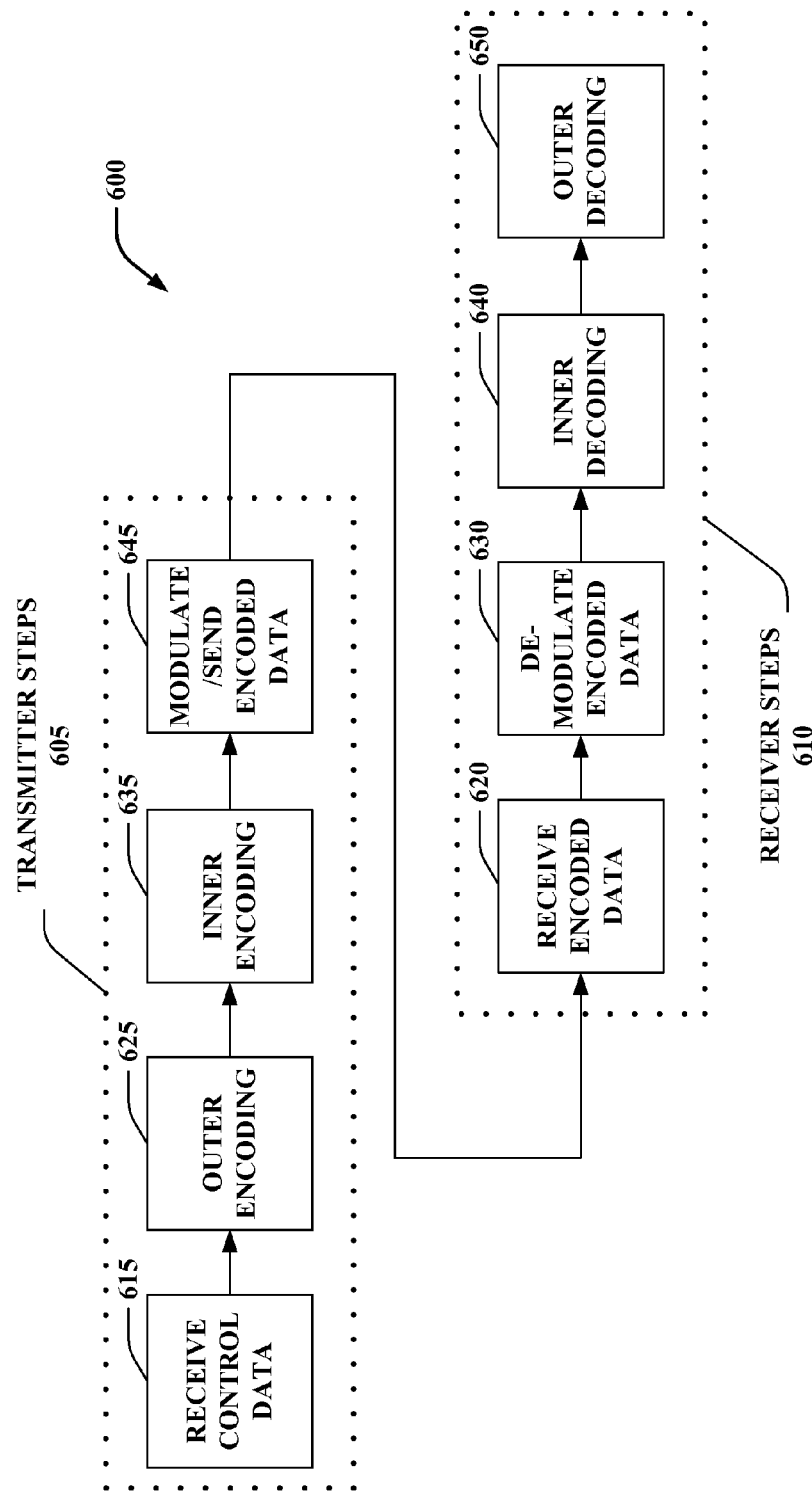
FIG. 6 is a flow chart illustrating an exemplary methodology for encoding and decoding beacon-based control signals in accordance with an aspect of the subject specification.

Referring next to FIG. 6, a flow chart illustrating an exemplary methodology for encoding and decoding a beacon-based control signal with concatenated codes is provided. As illustrated, process 600 includes a series of steps performed by a transmitter 605 followed by a series of steps performed by a receiver 610.

In an aspect, process 600 begins with a set of control bits being received at step 615. Here, it should be appreciated that the control bits could have originated from the transmitter itself (e.g., via a user interface), or the control bits could have originated externally whereby the transmitter may be relaying the control information. Next, at step 625, the control bits are encoded by an outer encoder, wherein such code may include any of a plurality of encoding schemes known in the art. Once the control bits have been encoded at step 625, process 600 continues to step 635 where the encoded control bits are encoded with a second code layer by an inner encoder. The multi-encoded control bits are then modulated and transmitted as beacons at step 645, as shown. The beacons sent at step 645 are subsequently received by a receiver at step 620. Upon receiving the beacons, process 600 proceeds with the receiver demodulating the beacons at step 630. The demodulated data stream is then decoded by the inner decoder at step 640, and subsequently decoded by the outer decoder at step 650, so as to recover the original set of control bits.

Here, it should be appreciated that, although transmitter steps 605 are illustrated as having the control bits encoded by the outer encoder 625 before the inner encoder 635, other embodiments may have the inner encoding occur prior to the outer encoding. For instance, if the outer encoder utilizes error control code X and the inner encoder utilizes error control code Y, transmitter steps 605 may include either an XY or YX encoding order so long as receiver steps 610 include a consistent decoding scheme.

Figure 7:
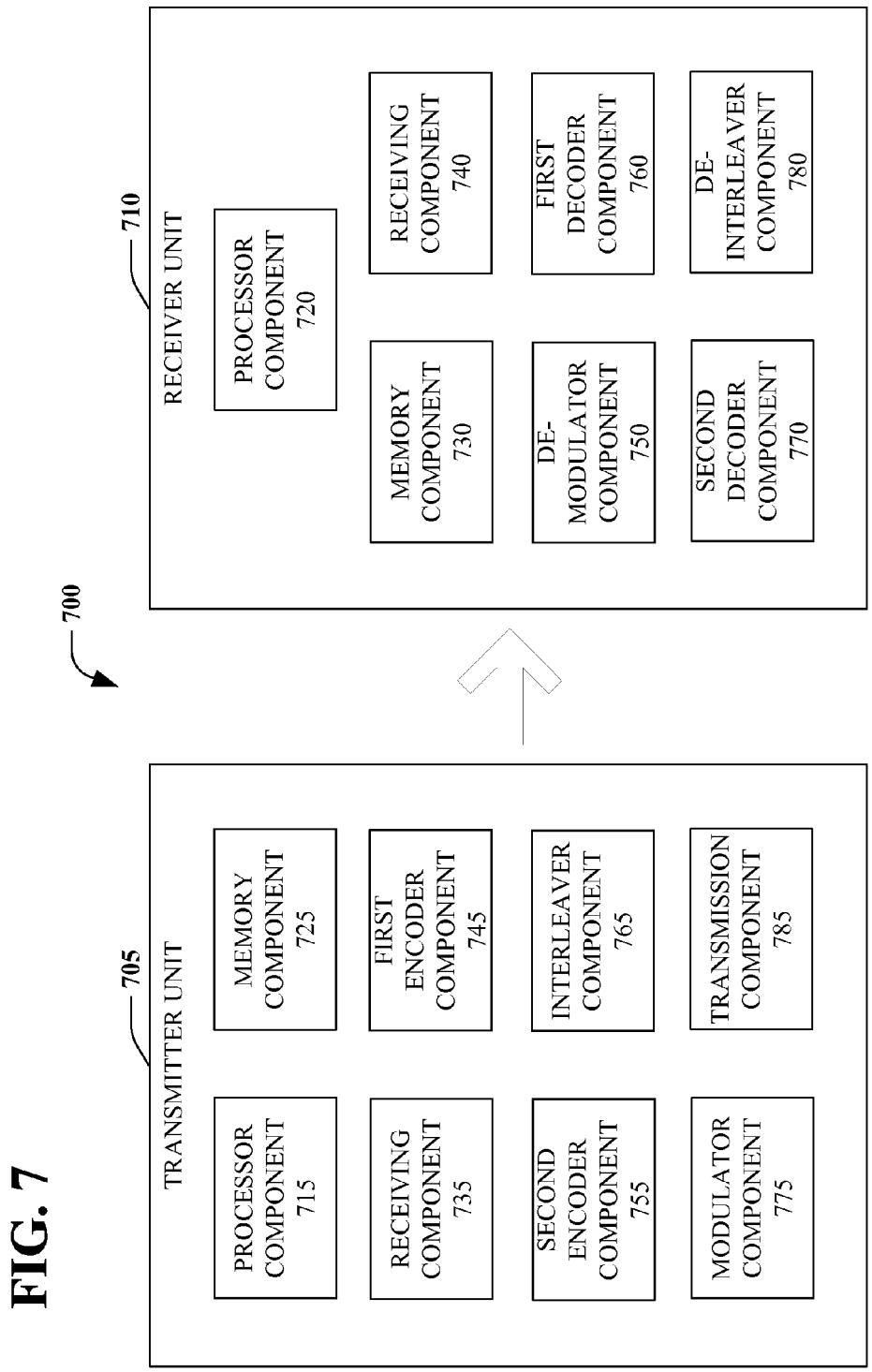
FIG. 7 illustrates a block diagram of an exemplary system that facilitates encoding and decoding beacon-based control signals in accordance with an aspect of the subject specification.

Referring next to FIG. 7, a block diagram of an exemplary system that facilitates encoding and decoding beacon-based control signals with concatenated codes is provided. In an aspect, system 700 can be utilized in a wireless communication network to allow mobile devices to communicate with each other and/or with base stations. As illustrated, system 700 includes one or more transmitter units 705 transmitting encoded beacon-based control data to one or more receiver units 710. Transmitter unit 705 and/or receiver unit 710 can be base stations, mobile devices, or other system components that communicate information.

In an aspect, transmitter unit 705 may include processor component 715, memory component 725, receiving component 735, first encoder component 745, second encoder component 755, interleaver component 765, modulator component 775, and transmission component 785.

In one aspect, processor component 715 is configured to execute computer-readable instructions related to performing any of a plurality of functions. Processor component 715 can be a single processor or a plurality of processors dedicated to analyzing information to be communicated from transmitter unit 705 and/or generating information that can be utilized by memory component 725, receiving component 735, first encoder component 745, second encoder component 755, interleaver component 765, modulator component 775, and/or transmission component 785. Additionally or alternatively, processor component 715 may be configured to control one or more components of transmitter unit 705.

In another aspect, memory component 725 is coupled to processor component 715 and configured to store computer-readable instructions executed by processor component 715. Memory component 725 may also be configured to store any of a plurality of other types of data including control data received via receiving component 735, as well as data generated by any of first encoder component 745, second encoder component 755, interleaver component 765, modulator component 775, and/or transmission component 785. Memory component 725 can be configured in a number of different configurations, including as random access memory, battery-backed memory, hard disk, magnetic tape, etc. Various features can also be implemented upon memory component 725, such as compression and automatic back up (e.g., use of a Redundant Array of Independent Drives configuration).

In yet another aspect, receiving component 735 and transmission component 785 are also coupled to processor component 715 and configured to interface transmitter unit 705 with external entities. For instance, receiving component 735 may be configured to receive encoded beacon-based control data transmitted from other devices (e.g., from other transmitter units 705 so as to relay such data to receiver unit 710), whereas transmission component 785 may be configured to transmit encoded beacon-based control data to receiver unit 710. It should also be appreciated that, because control data to be transmitted may originate from transmitter unit 705, receiver component 735 may be configured to receive inputs from other components within transmitter unit 705.

In accordance with a particular embodiment, control data to be transmitted is passed through each of first encoder component 745 and second encoder component 755 so as to encode the control data with two layers of code. Here, it should be appreciated that any of a plurality of error control codes may be utilized so as to achieve any of a plurality of design objectives. Moreover, although the examples provided herein utilize Reed-Solomon encoders, one of ordinary skill in the art will appreciate that other coding schemes may also be implemented.

In some aspects, transmitter unit 705 may also include interleaver component 765, which may be configured to perform a frequency and/or time interleaving function on the control data before, after, and/or in between the two encoding steps. Modulator component 775 may also be included and configured to modulate the encoded/interleaved data as beacon tones, wherein the beacon tones are subsequently transmitted to receiver unit 710 via transmission component 785.

As illustrated, receiver unit 710 may include any of a plurality of components including processor component 720, memory component 730, receiving component 740, first decoder component 760, second decoder component 770, de-interleaver component 780, and de-modulator component 750.

In one aspect, receiving component 740 is configured to receive the beacon tones transmitted from transmitter unit 705, and processor component 720 and memory component 730 are configured to provide functions generally analogous to the their counterpart components, 715 and 725, in transmitter unit 705. With respect to the remaining components of receiver unit 710, it should be appreciated that these components are generally configured to perform functions that complement their counterpart components in transmitter unit 705. For instance, first decoder component 760 is configured to decode the encoding of first encoder component 745, second decoder component 770 is configured to decode the encoding of second encoder component 755, de-interleaver component 780 is configured to de-interleave the interleaving of interleaver component 765, and de-modulator component 750 is configured to de-modulate the modulation of modulator component 775.

In the subsequent discussion, particular examples of how the aforementioned method/system for utilizing concatenated codes are provided. In particular, encoding/decoding embodiments are provided to show how concatenated codes can be utilized to adjust false alarm probability and to increase the number of control bits a beacon codeword can carry. Here, it should be appreciated that such embodiments are provided for illustrative purposes only and should not be construed as an exhaustive list of potential applications.

Figure 8:
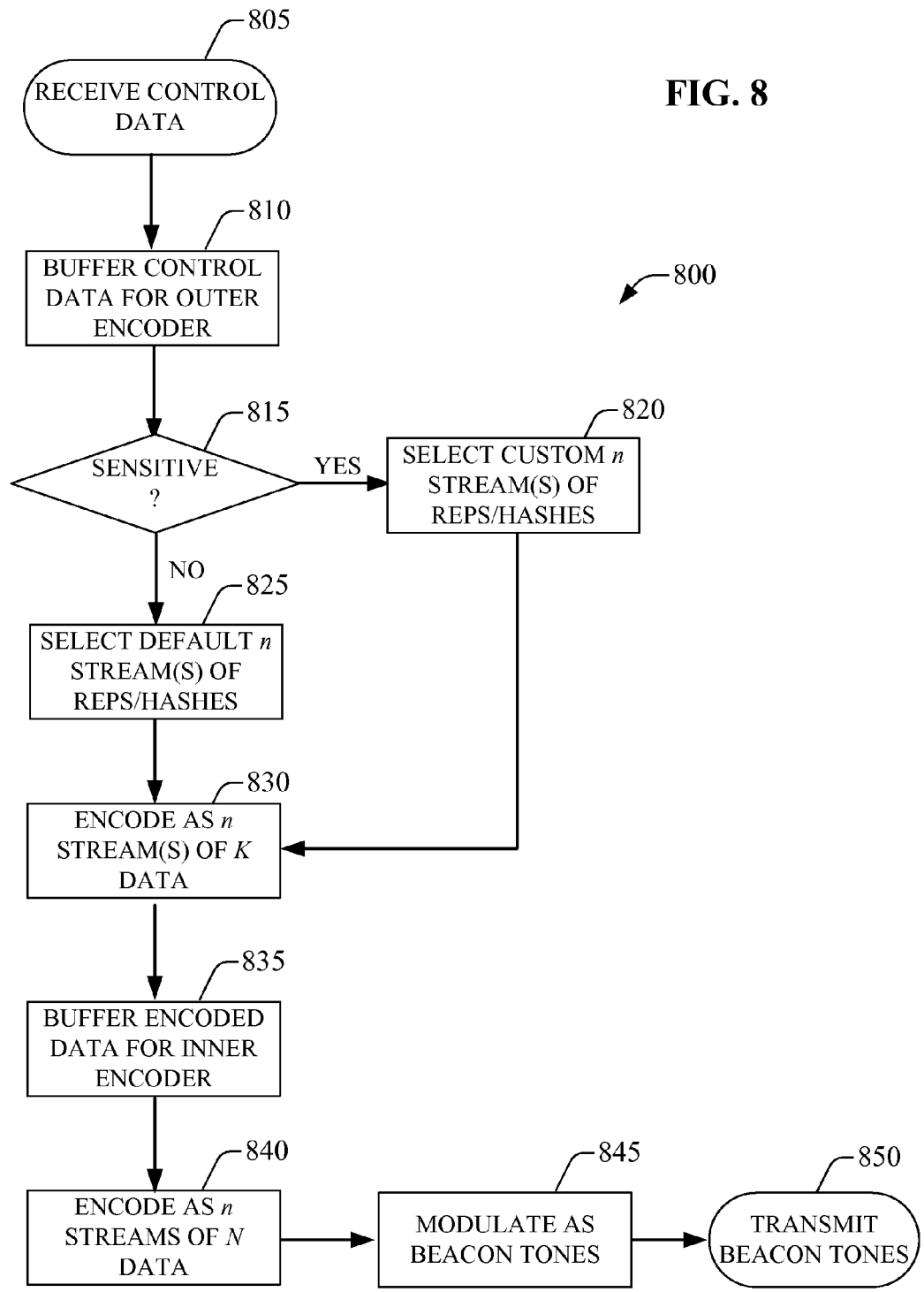
FIG. 8 is a flow chart illustrating an exemplary methodology for encoding control signals as beacons with concatenated codes so as to facilitate a lower false alarm probability.

In FIG. 8, a flow chart is provided illustrating an exemplary methodology for encoding control signals as beacons with concatenated codes so as to facilitate providing multiple false alarm probability levels. As illustrated, process 800 begins at step 805 where control data is received. Once the control data is received, the control data is buffered for an outer encoder at step 810, wherein the outer code could be a repetition code and/or a hash function.

Next, at step 815 a determination is made as to the sensitivity of the control data. In particular, a determination is made as to whether the control data should be encoded with a default false alarm probability scheme at step 825 or a custom probability scheme at step 820. Here, it should be noted that the "sensitivity" determination at step 815 could include ascertaining whether the false alarm probability of the control data should be lower or higher than the default false alarm probability. Indeed, because the default false alarm probability scheme may already be particularly robust, some embodiments may include determining which sets of control data are less sensitive, relative to other control messages, and may be encoded with a scheme that utilizes less computational resources than the default scheme.

For this particular example, it should be noted that if K information bits need to be transmitted with significantly lower false alarm probability than regular beacon messages (as is the case with the "sticky" control message described earlier), the outer encoder could append the K bits with another K bits which are the hashed version of the first K bits. More hashed copies can be made, resulting in n*K coded bits. Accordingly, process 800 encodes control data as n stream(s) of K bits at step 830, wherein the value n is determined at either step 820 or 825 depending on the sensitivity of the control data.

At step 835, process 800 then continues with the n stream(s) of outer-encoded control bits being buffered for an inner encoder. In an aspect, the inner code could be a Reed-Solomon code, wherein the inner encoder encodes the n stream(s) of K bits as n stream(s) of N bits at step 840. Each of the n stream(s) of encoded data are then modulated as beacons at step 845 and subsequently transmitted at step 850. Here, in addition to the outer/inner encoding of the control data, it should be noted that an interleaving step (not pictured) may also be included, wherein such an interleaving step may be included before, after, and/or in-between the outer/inner encoding steps.

Figure 9:
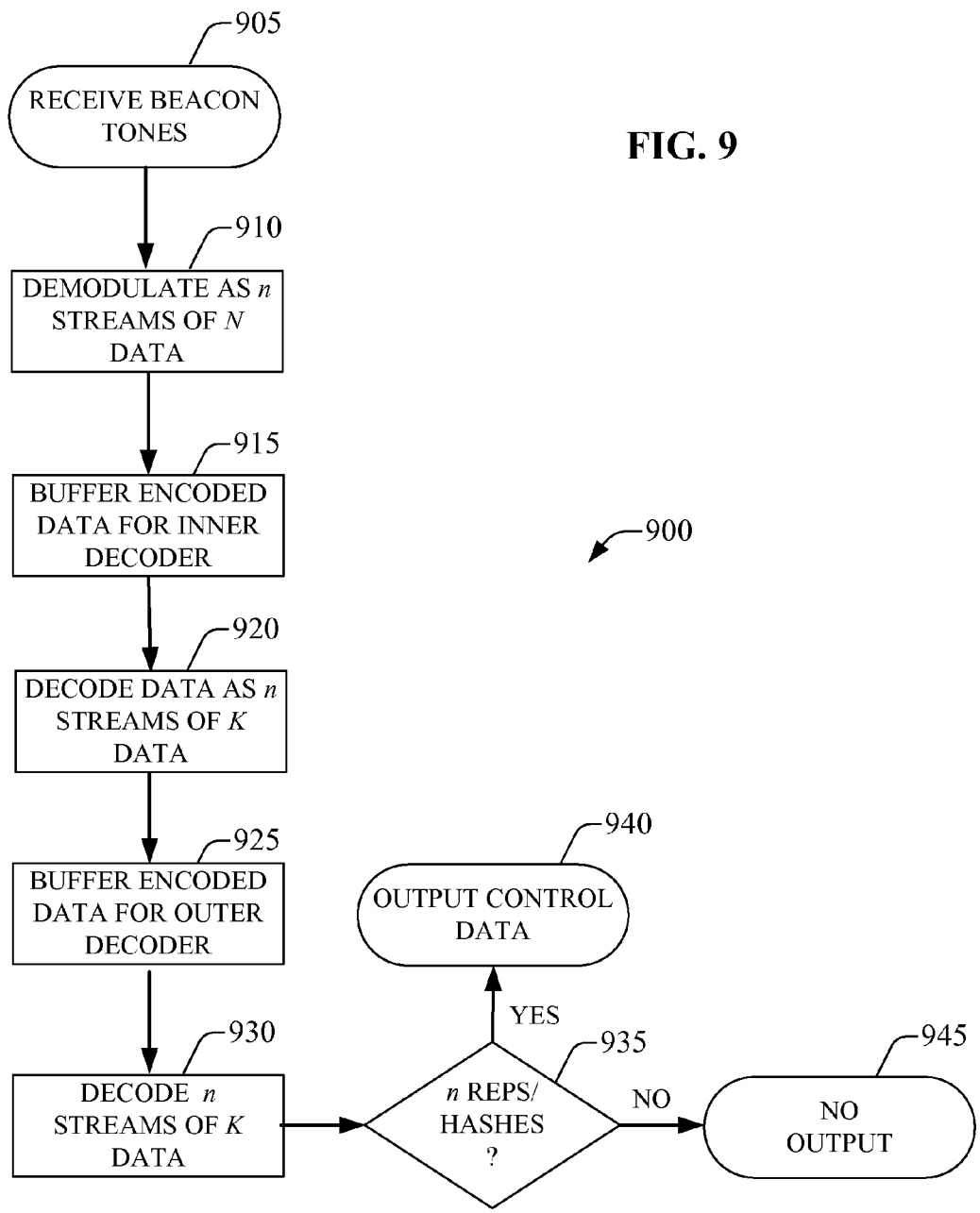
FIG. 9 is a flow chart illustrating an exemplary methodology for decoding beacon-based control signals with concatenated codes so as to facilitate a lower false alarm probability.

Referring next to FIG. 9, a flow chart illustrating an exemplary methodology for decoding the beacons generated by process 800 is provided. As illustrated, process 900 begins with the beacons being received by a receiver at step 905. The beacons are then demodulated at step 910 as n stream(s) of N encoded bits, and subsequently buffered for an inner decoder at step 915. Next, at step 920, the inner decoder decodes each of the n stream(s) of N encoded bits as n stream(s) of K outer-encoded bits, which are subsequently buffered for an outer decoder at step 925.

At step 930, each of the n stream(s) of K outer-encoded bits are then decoded according to the outer-encoding scheme utilized in process 800. For this particular example, it is assumed that the control data was encoded with a repetition code and/or a hash function outer-encoding scheme. Moreover, so as to minimize the likelihood of a false alarm, a particular set of control data may have been encoded to include multiple hashed versions of the control data (e.g., n hash versions). As such, at step 935, a determination is made as to whether a correct number of hashed versions have been received. If so, the control data is assumed to not be a false alarm, wherein the control data is subsequently output at step 940. Otherwise, no data is output, as illustrated in step 945.

Figure 10:
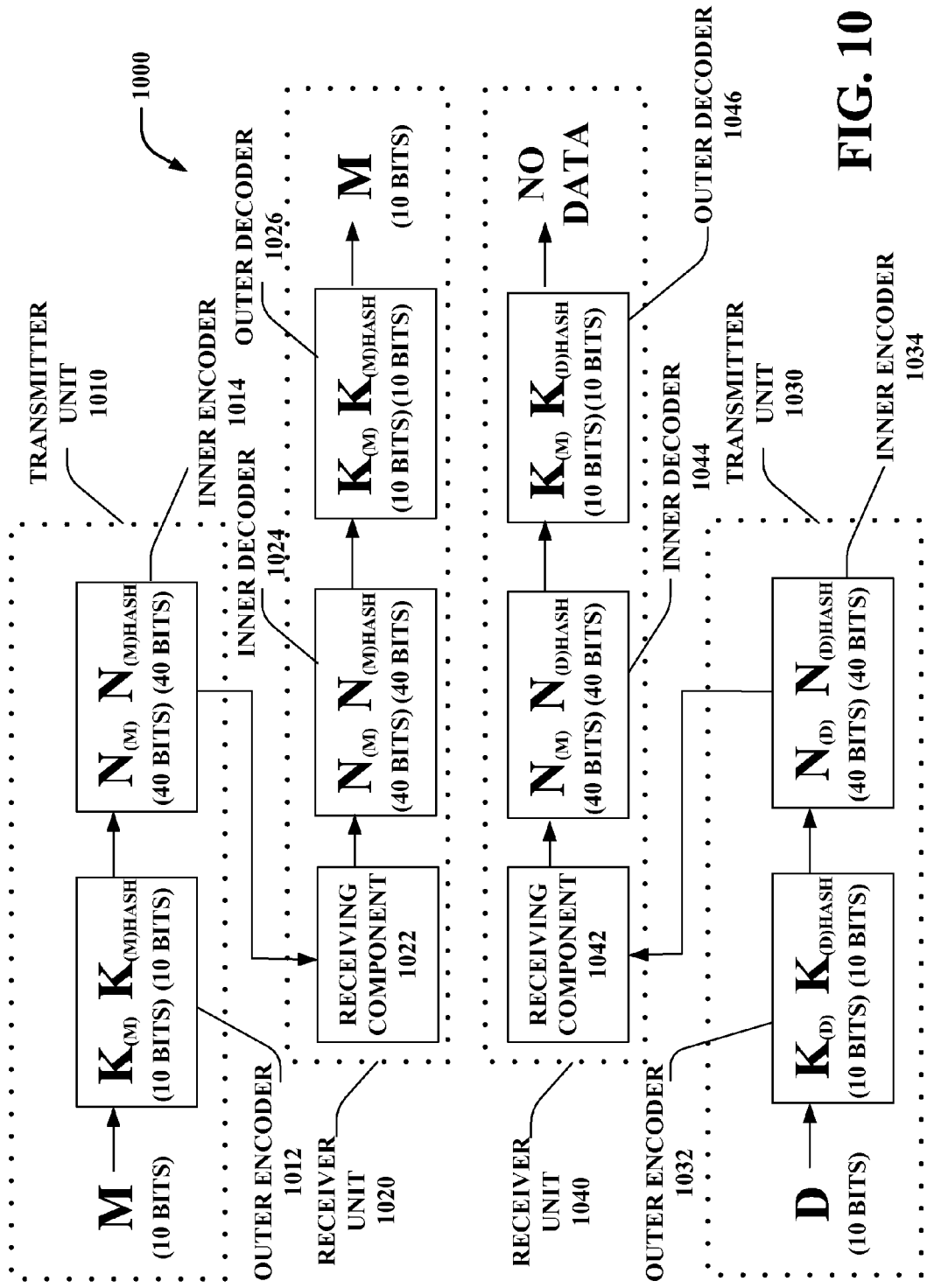
FIG. 10 illustrates an exemplary encoding and decoding process for facilitating a lower false alarm probability in processing two sample sets of control bits in accordance with an aspect of the subject specification.

Referring next to FIG. 10, an exemplary encoding and decoding process for facilitating a lower false alarm probability is provided. As illustrated, process 1000 includes the processing of two sets of control data, M and D, wherein control data M is transmitted from transmitter unit 1010 to receiving unit 1020 and control data D is transmitted from transmitter unit 1030 to receiving unit 1040. For this illustration, an exemplary bit-size for each of control data M and D is provided at particular steps of process 1000.

In an aspect, control data M may include ten bits which are input into outer encoder 1012, as shown. For this particular example, outer encoder 1012 encodes control data M as n streams of K data (e.g., a first 10-bit stream $K_M$ and a second 10-bit stream $K_{(M)HASH}$). Each of $K_M$ and $K_{(M)HASH}$ are then input into inner encoder 1014 where they are encoded as n streams of N data (e.g., a first 40-bit stream $N_M$ and a second 40-bit stream $N_{(M)HASH}$). Transmitter unit 1010 then modulates $N_M$ and $N_{(M)HASH}$ as beacons which are sent to receiving unit 1020 and received by receiving component 1022.

After demodulating the received beacons as $N_M$ and $N_{(M)HASH}$, inner decoder 1024 decodes $N_M$ and $N_{(M)HASH}$ as $K_M$ and $K_{(M)HASH}$. Each of $K_M$ and $K_{(M)HASH}$ are then input into outer decoder 1026, as shown. Here, if it is assumed that outer decoder 1026 is configured to decode $K_M$ only if $K_{(M)HASH}$ is also received, $K_M$ is decoded as control data M since both $K_M$ and $K_{(M)HASH}$ were indeed received.

For this particular example, control data D may similarly include ten bits and be input into outer encoder 1032, as shown. Outer encoder 1032 may then encode control data D as n streams of K data (e.g., a first 10-bit stream $K_D$ and a second 10-bit stream $K_{(D)HASH}$). Each of $K_D$ and $K_{(D)HASH}$ are then input into inner encoder 1034 where they are encoded as n streams of N data (e.g., a first 40-bit stream $N_D$ and a second 40-bit stream $N_{(D)HASH}$). Transmitter unit 1030 then modulates $N_D$ and $N_{(D)HASH}$ as beacons which are sent to receiving unit 1040.

Here, for illustrative purposes, it will be assumed that an error occurred such that beacons received by receiving component 1042 are erroneously demodulated as $N_M$ and $N_{(D)HASH}$, which are input into inner decoder 1044. As illustrated, inner decoder 1044 then decodes $N_M$ and $N_{(D)HASH}$ as $K_M$ and $K_{(D)HASH}$, which are input into outer decoder 1046. Here, if outer decoder 1046 is configured to decode $K_M$ only if $K_{(M)HASH}$ is also received, $K_M$ will not be decoded as control data M since $K_{(M)HASH}$ was not received. In fact, for this particular example, receiving unit 1040 does not output either of control data M or control data D. Accordingly, the concatenated coding scheme described herein prevented a false alarm output of control data M.

Figure 11:
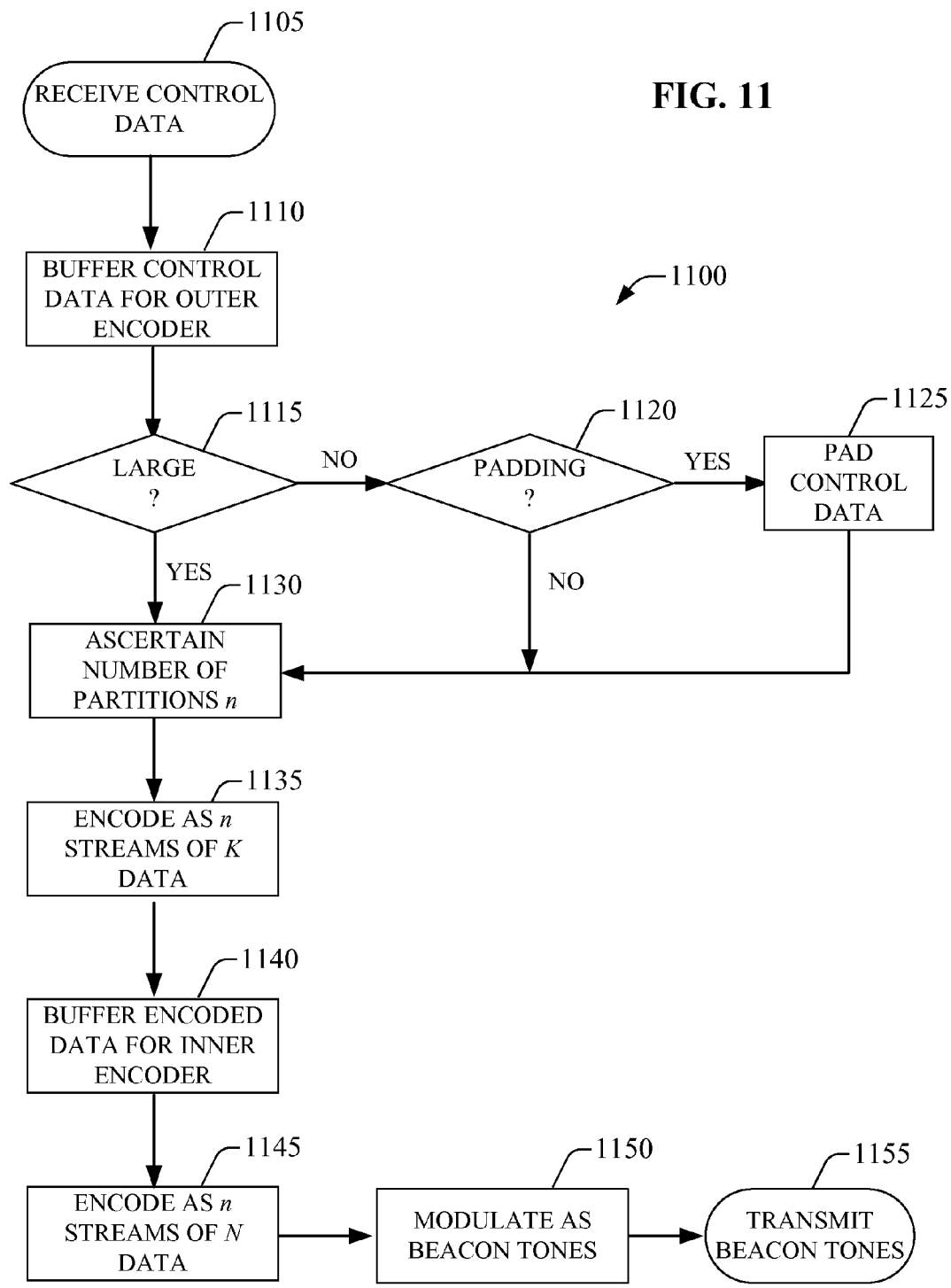
FIG. 11 is a flow chart illustrating an exemplary methodology for encoding control signals as beacons with concatenated codes so as to facilitate increasing the number of control bits per codeword.

Referring next to FIG. 11, a flow chart is provided illustrating an exemplary methodology for encoding control signals as beacons with concatenated codes so as to facilitate increasing the number of control bits per codeword. As illustrated, process 1100 begins at step 1105 when control data is received. Once the control data is received, the control data is buffered for an outer encoder at step 1110, wherein the outer code could be a Reed-Solomon code.

Next, at step 1115 a determination is made as to the relative bit-size of the received control data. In particular, a determination is made as to whether the control data exceeds a size threshold so as to determine how many partitions n, if any, the control data should be partitioned into. If the control data does not exceed the size threshold, a determination is then made at step 1120 as to whether the control data requires "padding" at step 1125 (e.g., if the size of the control data is too small, "padded" bits may be appended to the control data). In an aspect, after either determining that padding was not required at step 1120 or padding the control data at step 1125, process 1100 proceeds to step 1130 where the number of partitions n is set to 1.

However, if at step 1115 a determination is made that the control data does indeed exceed the size threshold, process 1100 proceeds to step 1130 where an appropriate number of n partitions is ascertained. In an aspect, so as to overcome potential disambiguation issues, the partitioning of the control data includes an adequate amount of redundancy so as to determine how to reconstruct the n partitions when decoding. Here, it should be noted that the appropriate value for n depends on the desired amount of bit-redundancy, wherein a higher value for n generally results in higher decoding reliability.

Once the proper n value has be determined, from step 1130, process 1100 proceeds with encoding the control data as n stream(s) of K bits at step 1135. At step 1140, the n stream(s) of outer-encoded control bits are then buffered for an inner encoder. In an aspect, the inner code could be a Reed-Solomon code, wherein the inner encoder encodes the n stream(s) of K bits as n stream(s) of N bits at step 1145. Each of the n stream(s) of encoded data are then modulated as beacons at step 1150 and subsequently transmitted at step 1155. Here, in addition to the outer/inner encoding of the control data, it should be noted that an interleaving step (not pictured) may also be included, wherein such an interleaving step may be included before, after, and/or in-between the outer/inner encoding steps.

Figure 12:
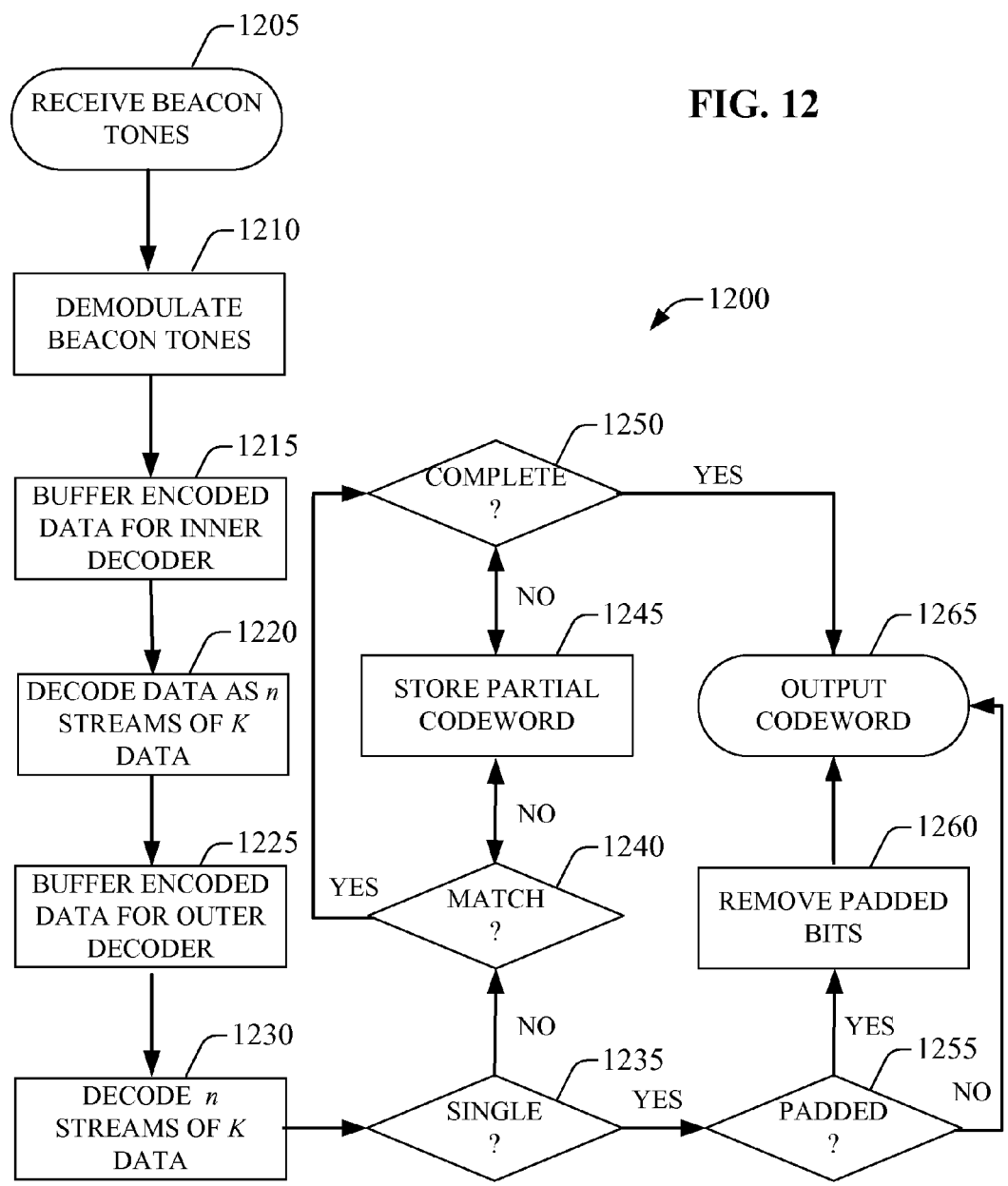
FIG. 12 is a flow chart illustrating an exemplary methodology for decoding beacon-based control signals with concatenated codes so as to facilitate increasing the number of control bits per codeword.

Referring next to FIG. 12, a flow chart illustrating an exemplary methodology for decoding the beacons generated by process 1100 is provided. As illustrated, process 1200 begins with the beacons being received by a receiver at step 1205. The beacons are then demodulated at step 1210 as n stream(s) of N encoded bits, and subsequently buffered for an inner decoder at step 1215. Next, at step 1220, the inner decoder decodes each of the n stream(s) of N encoded bits as n stream(s) of K outer-encoded bits, which are subsequently buffered for an outer decoder at step 1225.

At step 1230, each of the n stream(s) of K outer-encoded bits are then decoded according to the outer-encoding scheme utilized in process 1100. In this example, for instance, a determination might be made at step 1235 as to whether a particular stream of K bits corresponds to an entire beacon codeword. If so, a determination is then made at step 1255 as to whether the K bits include padded bits, which would be subsequently removed at step 1260. In an aspect, after either determining that no padded bits were present at step 1255 or removing the padded bits at step 1260, process 1200 concludes at step 1265 where the codeword is decoded and output as control data.

However, if at step 1235 it is determined that a particular stream of K bits corresponds to only a part of a beacon codeword, process 1200 then determines at step 1240 whether the partial codeword could be matched with a previously stored partial codeword received from step 1245. If the partial codeword does not match with any of the previously stored partial codewords, the partial codeword is stored in memory at step 1245. However, if at step 1240 it is determined that the partial codeword indeed matches with a stored partial codeword, a determination is then made at step 1250 as to whether combining the matching partial codewords results in a "complete" codeword. If the combined partial codewords indeed represent a complete codeword, process 1200 concludes at step 1265 where the codeword is decoded and output as control data. Otherwise, if the combined partial codewords do not represent a complete codeword, the partial codewords are stored in memory at step 1245.

Figure 13:
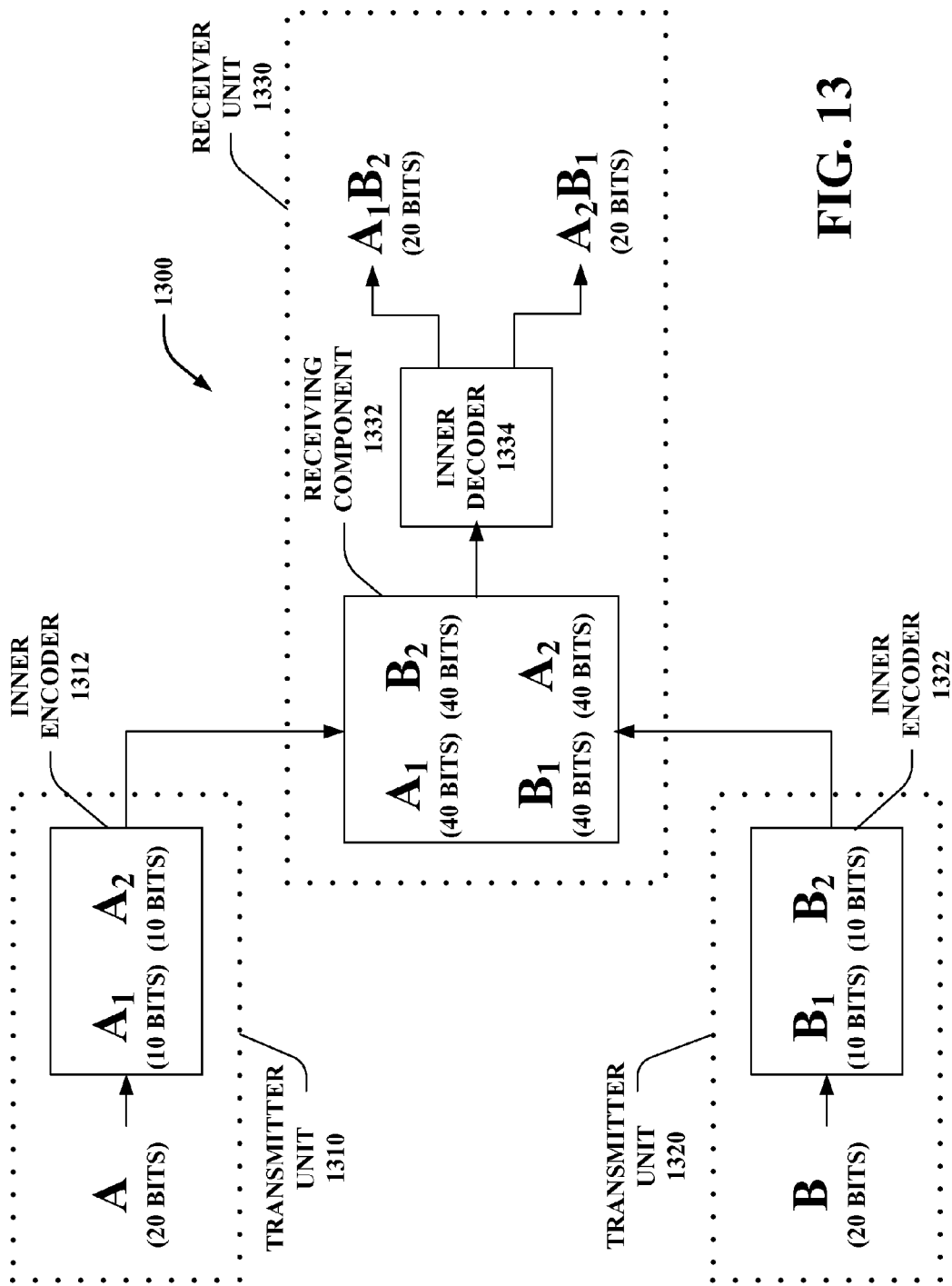
FIG. 13 illustrates an exemplary encoding and decoding process that utilizes a single encoder/decoder to process a large control codeword.

To better illustrate the utility of implementing a concatenated encoding scheme with respect to increasing the number of control bits a codeword can carry, an exemplary encoding/decoding process that utilizes a single encoder/decoder to process a "large" control codeword is provided in FIG. 13. For this particular example, it will be assumed that decoding constraints of an inner decoder provide that only 40 bits of encoded control data (N) may be decoded at any given time. It will be further assumed that the alphabet size (Q) is 32 and that an inner encoder encodes 10 control bits (K) as 40 encoded bits (N). Accordingly, decoding constraints of this single encoder/decoder system prohibit the encoding of control data K that is larger than two information symbols in length (i.e., two 5-bit information symbols) since the decoder cannot decode codewords N larger than eight encoded symbols in length (i.e., eight 5-bit information symbols).

As illustrated, process 1300 includes each of transmitter units 1310 and 1320 attempting to respectively transmit control data A and B to receiver unit 1330. However, because each of control data A and B are 20 bits in length, inner encoders 1312 and 1322 attempt to respectively partition A and B into two 10-bit streams of data (i.e., A is partitioned into $A_1$ and $A_2$, whereas B is partitioned into $B_1$ and $B_2$). Receiving component 1332 then receives encoded 40-bit versions of $A_1, A_2, B_1$, and $B_2$, as shown, wherein $A_1, A_2, B_1$, and $B_2$ may have been received asynchronously. Here, however, inner decoder 1334 cannot disambiguate $A_1, A_2, B_1$, and $B_2$ so as to properly reconstruct each of control data A and B. Moreover, because of this disambiguation issue, process 1300 may erroneously reconstruct control data A and B as $A_1B_2$ and $BA_2$, as shown.

Figure 14:
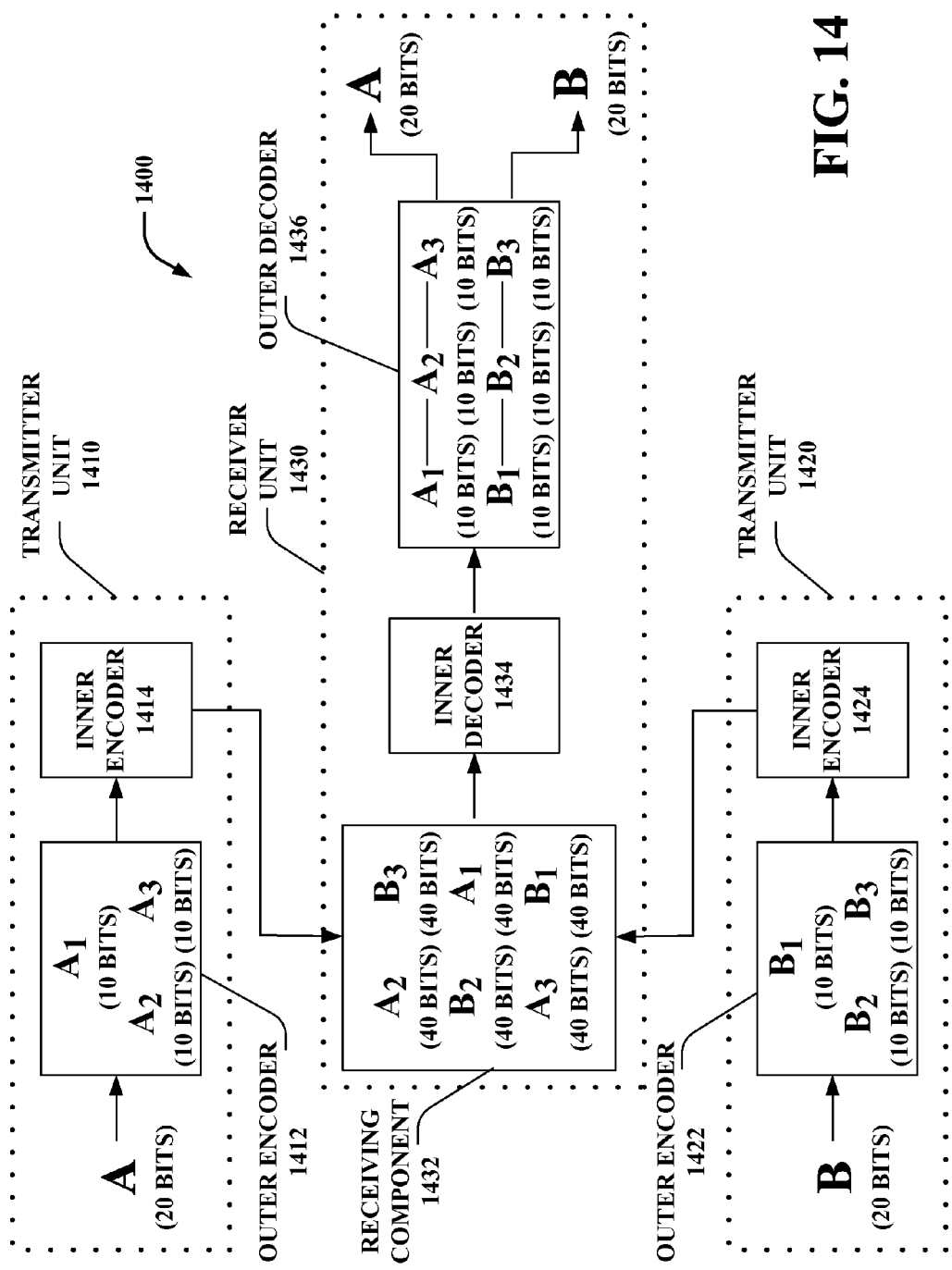
FIG. 14 illustrates an exemplary encoding and decoding process that utilizes concatenated codes to process a large control codeword in accordance with an aspect of the subject specification.

Referring next to FIG. 14, an exemplary process that utilizes concatenated codes is provided for encoding/decoding control data A and B of process 1300. Here, it should again be assumed that decoding constraints of an inner decoder provide that only 40 bits of encoded control data N may be decoded at any given time and that the alphabet size Q is again 32.

As illustrated, similar to process 1300, process 1400 includes each of transmitter units 1410 and 1420 attempting to respectively transmit control data A and B to receiver unit 1430. Here, however, control data A and B are respectively input into outer encoders 1412 and 1422 where they are partitioned into three 10-bit streams of data (i.e., A is partitioned into $A_1, A_2$, and $A_3$, whereas B is partitioned into $B_1, B_2$, and $B_3$). Moreover, control data A and B, each of which are 20-bits in length, are respectively encoded as 30 bits (i.e., three 10-bit streams of data for each of control data A and B), which includes a set of redundancy bits. As was stated previously, although the number of partitions n is here shown as being three, additional partitions could be included so as to increase redundancy.

Once control data A and B are encoded by outer encoders 1412 and 1422, $A_1, A_2$, and $A_3$ are serially input into inner encoder 1414, and $B_1, B_2$, and $B_3$ are serially input into inner encoder 1424. Process 1400 proceeds with receiving component 1432 receiving encoded 40-bit versions of $A_1, A_2, A_3$, $B_1, B_2$, and $B_3$, as shown, wherein $A_1, A_2, A_3, B_1, B_2$, and $B_3$ may have been received asynchronously. Inner decoder 1434 then serially decodes these 40-bit versions (not necessarily in this order) so as to produce 10-bit versions of $A_1, A_2, A_3, B_1$, $B_2$, and $B_3$, which are subsequently input into outer decoder 1436. Outer decoder 1436 then utilizes the outer-encoded redundancy of $A_1, A_2, A_3, B_1, B_2$, and $B_3$ to properly disambiguate control data A and B (i.e., control data A is reconstructed by combining $A_1, A_2$, and $A_3$, whereas control data B is reconstructed by combining $B_1, B_2$, and $B_3$). Accordingly, the number of control bits a beacon codeword can carry was increased from ten to twenty via the disclosed concatenated encoding/decoding scheme.

Figure 15:
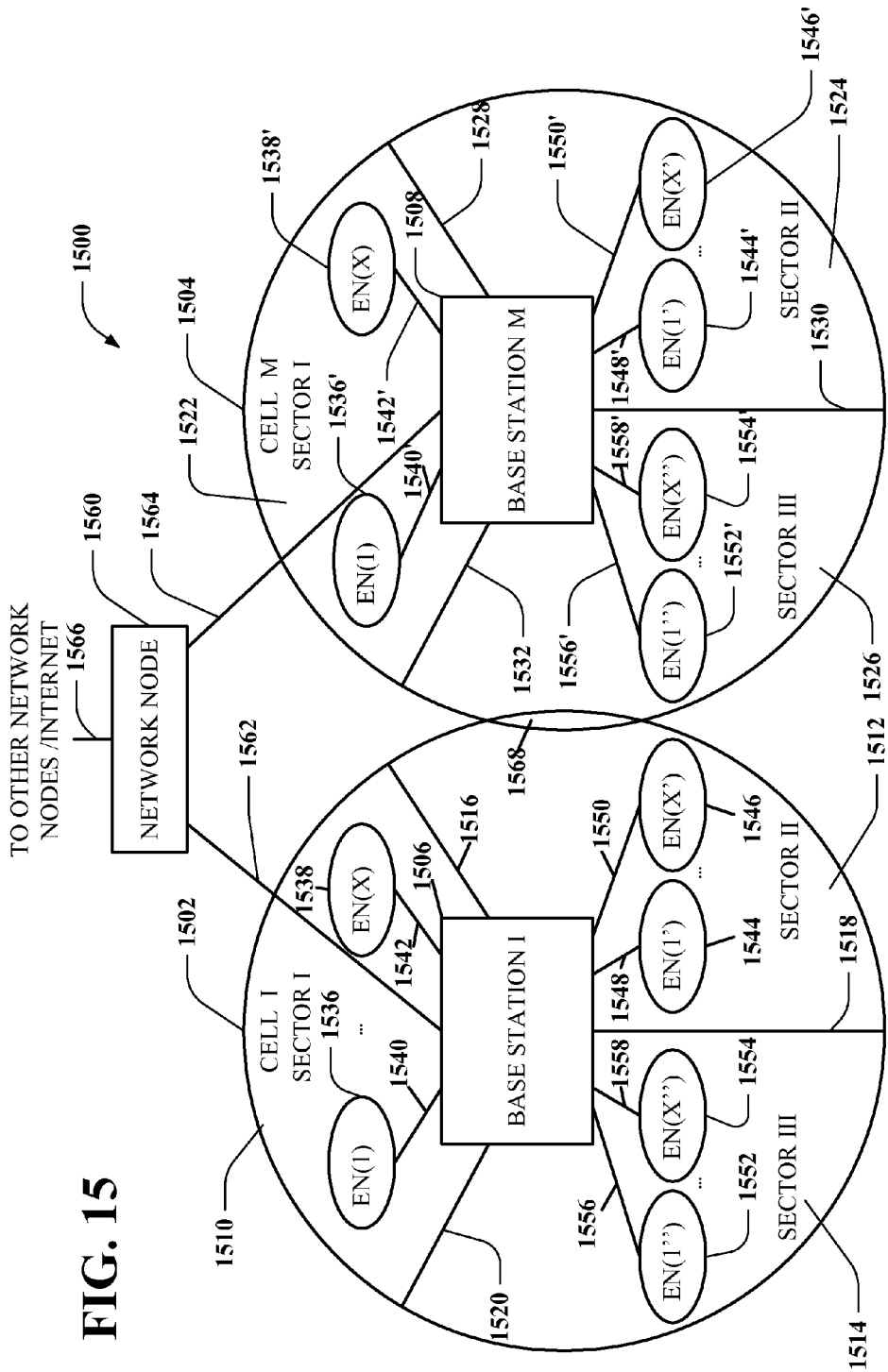
FIG. 15 is an illustration of an exemplary communication system implemented in accordance with various aspects including multiple cells.

Referring next to FIG. 15, an exemplary communication system 1500 implemented in accordance with various aspects is provided including multiple cells: cell 11502, cell M 1504. Here, it should be noted that neighboring cells 1502, 1504 overlap slightly, as indicated by cell boundary region 1568, thereby creating potential for signal interference between signals transmitted by base stations in neighboring cells. Each cell 1502, 1504 of system 1500 includes three sectors. Cells which have not been subdivided into multiple sectors (N=1), cells with two sectors (N=2) and cells with more than 3 sectors (N>3) are also possible in accordance with various aspects. Cell 1502 includes a first sector, sector I 1510, a second sector, sector II 1512, and a third sector, sector III 1514. Each sector 1510, 1512, 1514 has two sector boundary regions; each boundary region is shared between two adjacent sectors.

Sector boundary regions provide potential for signal interference between signals transmitted by base stations in neighboring sectors. Line 1516 represents a sector boundary region between sector I 1510 and sector II 1512; line 1518 represents a sector boundary region between sector II 1512 and sector III 1514; line 1520 represents a sector boundary region between sector III 1514 and sector I 1510. Similarly, cell M 1504 includes a first sector, sector I 1522, a second sector, sector II 1524, and a third sector, sector III 1526. Line 1528 represents a sector boundary region between sector I 1522 and sector II 1524; line 1530 represents a sector boundary region between sector II 1524 and sector III 1526; line 1532 represents a boundary region between sector III 1526 and sector I 1522. Cell I 1502 includes a base station (BS), base station I 1506, and a plurality of end nodes (ENs) in each sector 1510, 1512, 1514. Sector I 1510 includes EN(1) 1536 and EN(X) 1538 coupled to BS 1506 via wireless links 1540, 1542, respectively; sector II 1512 includes EN(1') 1544 and EN(X') 1546 coupled to BS 1506 via wireless links 1548, 1550, respectively; sector III 1514 includes EN(1") 1552 and EN(X") 1554 coupled to BS 1506 via wireless links 1556, 1558, respectively. Similarly, cell M 1504 includes base station M 1508, and a plurality of end nodes (ENs) in each sector 1522, 1524, 1526. Sector I 1522 includes EN(1) 1536' and EN(X) 1538' coupled to BS M 1508 via wireless links 1540', 1542', respectively; sector II 1524 includes EN(1') 1544' and EN(X') 1546' coupled to BS M 1508 via wireless links 1548', 1550', respectively; sector III 1526 includes EN(1″) 1552′ and EN(X″) 1554′ coupled to BS 1508 via wireless links 1556′, 1558′, respectively.

System 1500 also includes a network node 1560 which is coupled to BS I 1506 and BS M 1508 via network links 1562, 1564, respectively. Network node 1560 is also coupled to other network nodes, e.g., other base stations, AAA server nodes, intermediate nodes, routers, etc. and the Internet via network link 1566. Network links 1562, 1564, 1566 may be, e.g., fiber optic cables. Each end node, e.g. EN 1 1536 may be a wireless terminal including a transmitter as well as a receiver. The wireless terminals, e.g. EN(1) 1536 may move through system 1500 and may communicate via wireless links with the base station in the cell in which the EN is currently located. The wireless terminals, (WTs), e.g. EN(1) 1536, may communicate with peer nodes, e.g., other WTs in system 1500 or outside system 1500 via a base station, e.g. BS 1506, and/or network node 1560. WTs, e.g., EN(1) 1536 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Figure 16:
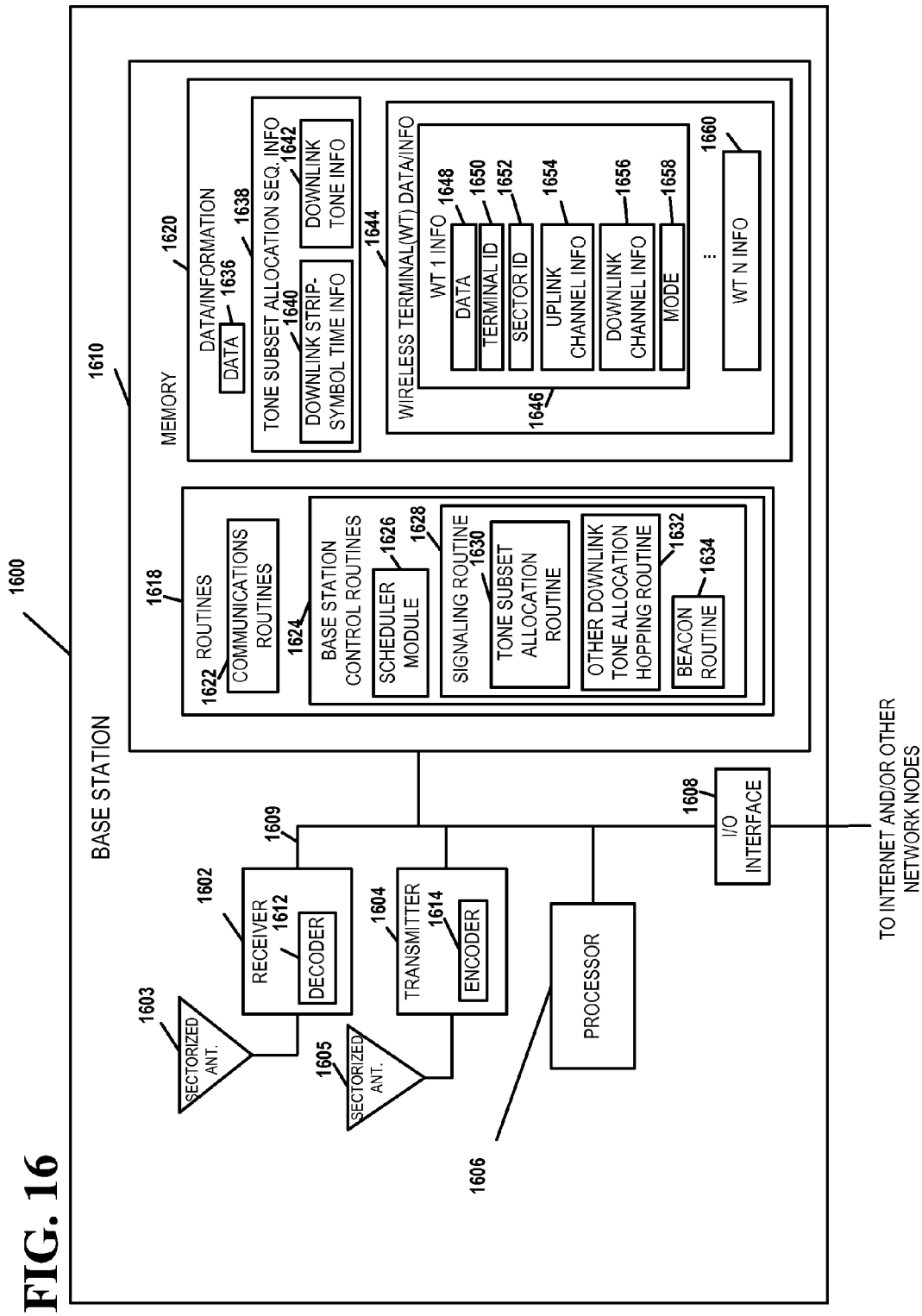
FIG. 16 is an illustration of an exemplary base station in accordance with various aspects described herein.

FIG. 16 illustrates an example base station 1600 in accordance with various aspects. Base station 1600 implements tone subset allocation sequences, with different tone subset allocation sequences generated for respective different sector types of the cell. Base station 1600 may be used as any one of base stations 1506, 1508 of the system 1500 of FIG. 15. The base station 1600 includes a receiver 1602, a transmitter 1604, a processor 1606, e.g., CPU, an input/output interface 1608 and memory 1610 coupled together by a bus 1609 over which various elements 1602, 1604, 1606, 1608, and 1610 may interchange data and information.

Sectorized antenna 1603 coupled to receiver 1602 is used for receiving data and other signals, e.g., channel reports, from wireless terminals transmissions from each sector within the base station's cell. Sectorized antenna 1605 coupled to transmitter 1604 is used for transmitting data and other signals, e.g., control signals, pilot signal, beacon signals, etc. to wireless terminals 1700 (see FIG. 17) within each sector of the base station's cell. In various aspects, base station 1600 may employ multiple receivers 1602 and multiple transmitters 1604, e.g., an individual receivers 1602 for each sector and an individual transmitter 1604 for each sector. Processor 1606, may be, e.g., a general purpose central processing unit (CPU). Processor 1606 controls operation of base station 1600 under direction of one or more routines 1618 stored in memory 1610 and implements the methods. I/O interface 1608 provides a connection to other network nodes, coupling the BS 1600 to other base stations, access routers, AAA server nodes, etc., other networks, and the Internet. Memory 1610 includes routines 1618 and data/information 1620.

Data/information 1620 includes data 1636, tone subset allocation sequence information 1638 including downlink strip-symbol time information 1640 and downlink tone information 1642, and wireless terminal (WT) data/info 1644 including a plurality of sets of WT information: WT 1 info 1646 and WT N info 1660. Each set of WT info, e.g., WT 1 info 1646 includes data 1648, terminal ID 1650, sector ID 1652, uplink channel information 1654, downlink channel information 1656, and mode information 1658.

Routines 1618 include communications routines 1622 and base station control routines 1624. Base station control routines 1624 includes a scheduler module 1626 and signaling routines 1628 including a tone subset allocation routine 1630 for strip-symbol periods, other downlink tone allocation hopping routine 1632 for the rest of symbol periods, e.g., non strip-symbol periods, and a beacon routine 1634.

Data 1636 includes data to be transmitted that will be sent to encoder 1614 of transmitter 1604 for encoding prior to transmission to WTs, and received data from WTs that has been processed through decoder 1612 of receiver 1602 following reception. Downlink strip-symbol time information 1640 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1642 includes information including a carrier frequency assigned to the base station 1600, the number and frequency of tones, and the set of tone subsets to be allocated to the strip-symbol periods, and other cell and sector specific values such as slope, slope index and sector type.

Data 1648 may include data that WT1 1700 has received from a peer node, data that WT 1 1700 desires to be transmitted to a peer node, and downlink channel quality report feedback information. Terminal ID 1650 is a base station 1600 assigned ID that identifies WT 1 1700. Sector ID 1652 includes information identifying the sector in which WT1 1700 is operating. Sector ID 1652 can be used, for example, to determine the sector type. Uplink channel information 1654 includes information identifying channel segments that have been allocated by scheduler 1626 for WT1 1700 to use, e.g., uplink traffic channel segments for data, dedicated uplink control channels for requests, power control, timing control, etc. Each uplink channel assigned to WT1 1700 includes one or more logical tones, each logical tone following an uplink hopping sequence. Downlink channel information 1656 includes information identifying channel segments that have been allocated by scheduler 1626 to carry data and/or information to WT1 1700, e.g., downlink traffic channel segments for user data. Each downlink channel assigned to WT1 1700 includes one or more logical tones, each following a downlink hopping sequence. Mode information 1658 includes information identifying the state of operation of WT1 1700, e.g. sleep, hold, on.

Communications routines 1622 control the base station 1600 to perform various communications operations and implement various communications protocols. Base station control routines 1624 are used to control the base station 1600 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1628 controls the operation of receiver 1602 with its decoder 1612 and transmitter 1604 with its encoder 1614. The signaling routine 1628 is responsible controlling the generation of transmitted data 1636 and control information. Tone subset allocation routine 1630 constructs the tone subset to be used in a strip-symbol period using the method of the aspect and using data/info 1620 including downlink strip-symbol time info 1640 and sector ID 1652. The downlink tone subset allocation sequences will be different for each sector type in a cell and different for adjacent cells. The WTs 1700 receive the signals in the strip-symbol periods in accordance with the downlink tone subset allocation sequences; the base station 1600 uses the same downlink tone subset allocation sequences in order to generate the transmitted signals. Other downlink tone allocation hopping routine 1632 constructs downlink tone hopping sequences, using information including downlink tone information 1642, and downlink channel information 1656, for the symbol periods other than the strip-symbol periods. The downlink data tone hopping sequences are synchronized across the sectors of a cell. Beacon routine 1634 controls the transmission of a beacon signal, e.g., a signal of relatively high power concentrated on one or a few tones, which may be used for synchronization purposes, e.g., to synchronize the frame timing structure of the downlink signal and therefore the tone subset allocation sequence with respect to an ultra-slot boundary.

Figure 17:
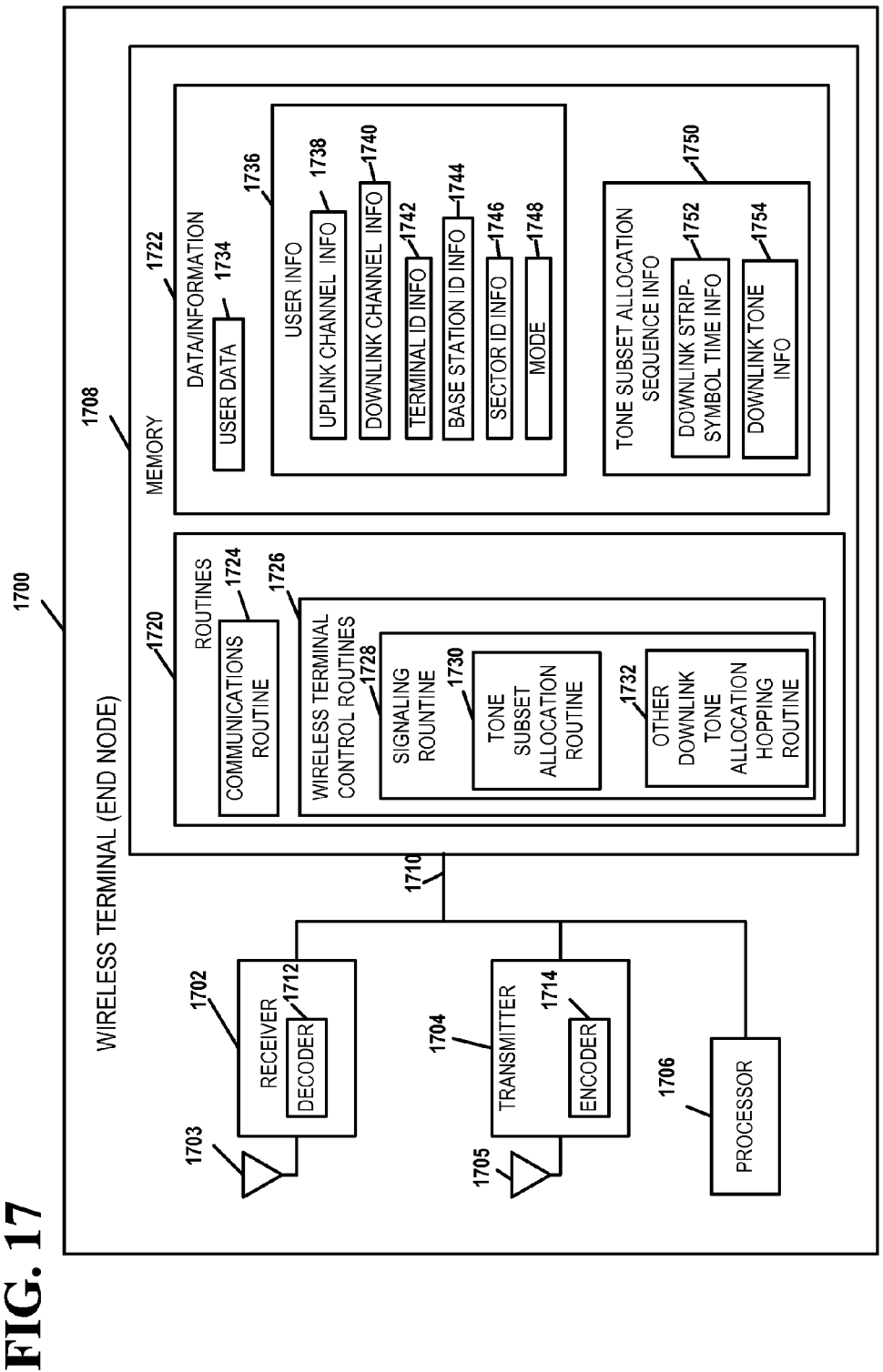
FIG. 17 is an illustration of an exemplary wireless terminal implemented in accordance with various aspects described herein.

FIG. 17 illustrates an example wireless terminal (end node) 1700 which can be used as any one of the wireless terminals (end nodes), e.g., EN(1) 1536, of the system 1500 shown in FIG. 15. Wireless terminal 1700 implements the tone subset allocation sequences. The wireless terminal 1700 includes a receiver 1702 including a decoder 1712, a transmitter 1704 including an encoder 1714, a processor 1706, and memory 1708 which are coupled together by a bus 1710 over which the various elements 1702, 1704, 1706, 1708 can interchange data and information. An antenna 1703 used for receiving signals from a base station (and/or a disparate wireless terminal) is coupled to receiver 1702. An antenna 1705 used for transmitting signals, e.g., to a base station (and/or a disparate wireless terminal) is coupled to transmitter 1704.

The processor 1706, e.g., a CPU controls the operation of the wireless terminal 1700 and implements methods by executing routines 1720 and using data/information 1722 in memory 1708.

Data/information 1722 includes user data 1734, user information 1736, and tone subset allocation sequence information 1750. User data 1734 may include data, intended for a peer node, which will be routed to encoder 1714 for encoding prior to transmission by transmitter 1704 to a base station, and data received from the base station which has been processed by the decoder 1712 in receiver 1702. User information 1736 includes uplink channel information 1738, downlink channel information 1740, terminal ID information 1742, base station ID information 1744, sector ID information 1746, and mode information 1748. Uplink channel information 1738 includes information identifying uplink channels segments that have been assigned by a base station for wireless terminal 1700 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1740 includes information identifying downlink channel segments that have been assigned by a base station to WT 1700 for use when the base station is transmitting data/information to WT 1700. Downlink channels may include downlink traffic channels and assignment channels, each downlink channel including one or more logical tone, each logical tone following a downlink hopping sequence, which is synchronized between each sector of the cell.

User info 1736 also includes terminal ID information 1742, which is a base station-assigned identification, base station ID information 1744 which identifies the specific base station that WT has established communications with, and sector ID info 1746 which identifies the specific sector of the cell where WT 1700 is presently located. Base station ID 1744 provides a cell slope value and sector ID info 1746 provides a sector index type; the cell slope value and sector index type may be used to derive tone hopping sequences. Mode information 1748 also included in user info 1736 identifies whether the WT 1700 is in sleep mode, hold mode, or on mode.

Tone subset allocation sequence information 1750 includes downlink strip-symbol time information 1752 and downlink tone information 1754. Downlink strip-symbol time information 1752 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1754 includes information including a carrier frequency assigned to the base station, the number and frequency of tones, and the set of tone subsets to be allocated to the strip-symbol periods, and other cell and sector specific values such as slope, slope index and sector type.

Routines 1720 include communications routines 1724 and wireless terminal control routines 1726. Communications routines 1724 control the various communications protocols used by WT 1700. Wireless terminal control routines 1726 controls basic wireless terminal 1700 functionality including the control of the receiver 1702 and transmitter 1704. Wireless terminal control routines 1726 include the signaling routine 1728. The signaling routine 1728 includes a tone subset allocation routine 1730 for the strip-symbol periods and an other downlink tone allocation hopping routine 1732 for the rest of symbol periods, e.g., non strip-symbol periods. Tone subset allocation routine 1730 uses user data/info 1722 including downlink channel information 1740, base station ID info 1744, e.g., slope index and sector type, and downlink tone information 1754 in order to generate the downlink tone subset allocation sequences in accordance with some aspects and process received data transmitted from the base station. Other downlink tone allocation hopping routine 1732 constructs downlink tone hopping sequences, using information including downlink tone information 1754, and downlink channel information 1740, for the symbol periods other than the strip-symbol periods. Tone subset allocation routine 1730, when executed by processor 1706, is used to determine when and on which tones the wireless terminal 1700 is to receive one or more strip-symbol signals from the base station 1600. The uplink tone allocation hopping routine 1730 uses a tone subset allocation function, along with information received from the base station, to determine the tones in which it should transmit on.

Figure 18:
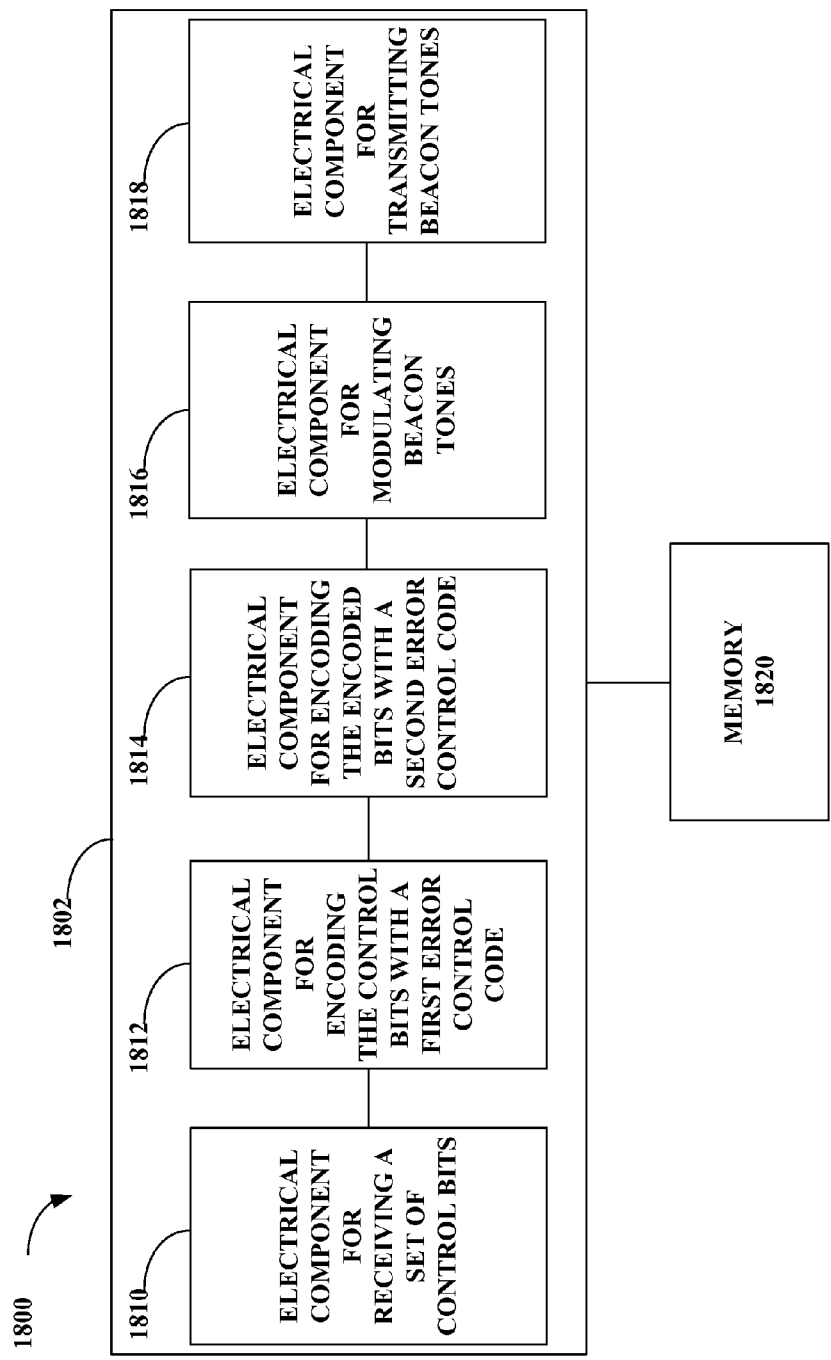
FIG. 18 is an illustration of an exemplary coupling of electrical components that effectuate encoding a control signal as a beacon in a wireless communication environment using concatenated codes.

Turning to FIG. 18, illustrated is a system 1800 that enables encoding a control signal as a beacon in a wireless communication environment using concatenated codes. System 1800 can reside within a base station or wireless terminal, for instance. As depicted, system 1800 includes functional blocks that can represent functions implemented by a processor, software, or combination thereof (e.g., firmware). System 1800 includes a logical grouping 1802 of electrical components that can act in conjunction. As illustrated, logical grouping 1802 can include an electrical component for receiving a set of control bits 1810. Further, logical grouping 1802 can include an electrical component for encoding the control bits with a first error control code 1812, and another electrical component for encoding the encoded bits with a second error control code 1814. Logical grouping 1802 can also include an electrical component for modulating the multi-coded control bits as beacon tones 1816, as well as an electrical component for transmitting the beacon tones 1818. Additionally, system 1800 can include a memory 1820 that retains instructions for executing functions associated with electrical components 1810, 1812, 1814, 1816, and 1818. While shown as being external to memory 1820, it is to be understood that electrical components 1810, 1812, 1814, 1816, and 1818 can exist within memory 1820.

Figure 19:
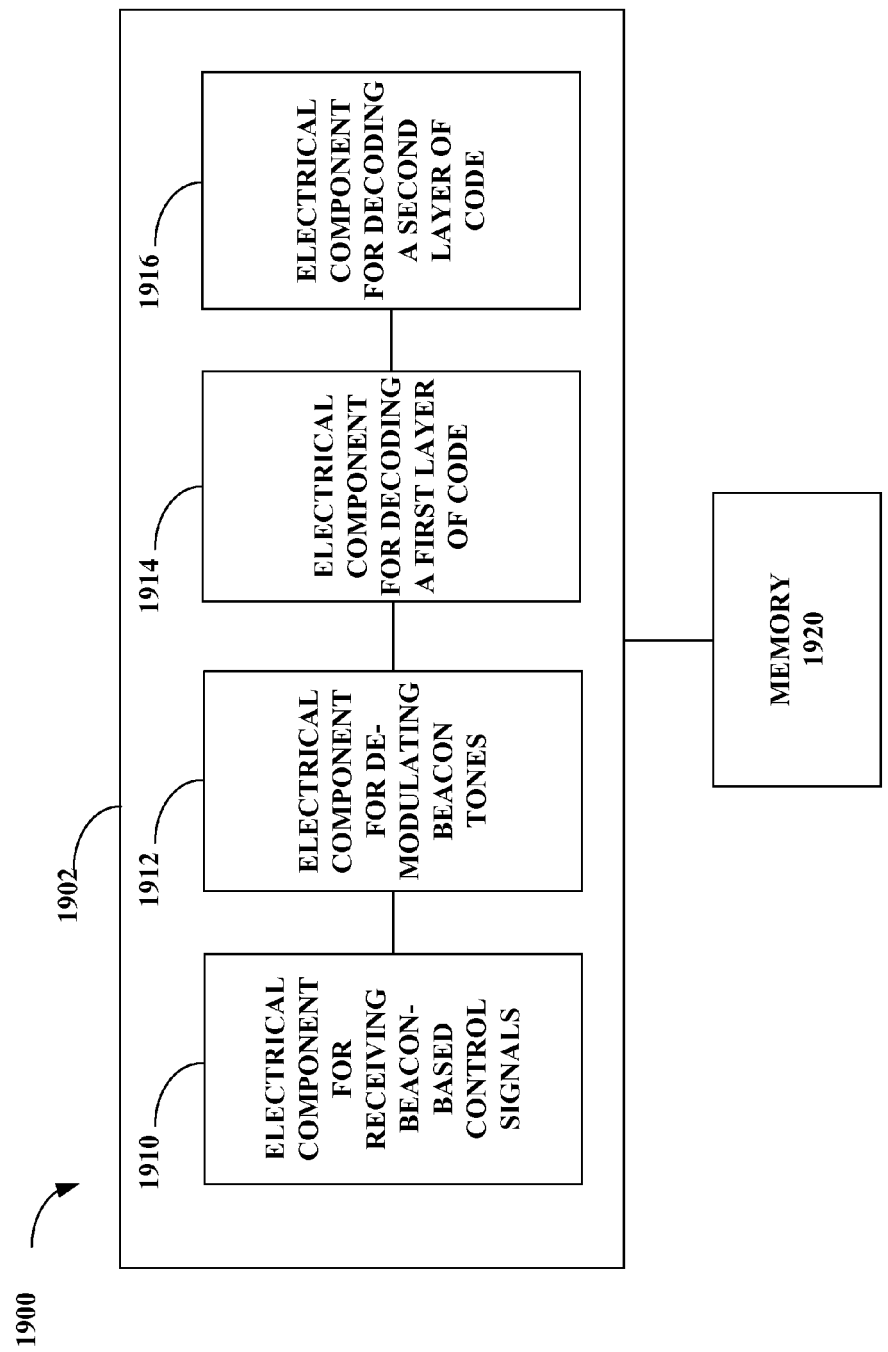
FIG. 19 is an illustration of an exemplary coupling of electrical components that effectuate decoding a beacon-based control signal in a wireless communication system.

Referring next to FIG. 19, illustrated is a system 1900 that enables decoding a beacon-based control signal in a wireless communication environment. Similar to system 1800, system 1900 can reside within a base station or wireless terminal, for instance, wherein system 1900 also includes functional blocks that can represent functions implemented by a processor, software, or combination thereof (e.g., firmware). Moreover, system 1900 includes a logical grouping 1902 of electrical components that can act in conjunction similar to logical grouping 1802 in system 1800. As illustrated, logical grouping 1902 can include an electrical component for receiving beacon-based control signals 1910. Further, logical grouping 1902 can include an electrical component for demodulating beacon tones 1912. Logical grouping 1902 can also include an electrical component for decoding a first layer of error control code 1914, as well as an electrical component for decoding a second layer of error control code 1916. Additionally, system 1900 can include a memory 1920 that retains instructions for executing functions associated with electrical components 1910, 1912, 1914, and 1916. While shown as being external to memory 1920, it is to be understood that electrical components 1910, 1912, 1914, and 1916 can exist within memory 1920.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method for encoding a wireless control signal, comprising:

receiving a set of information bits;

ascertaining a desired false alarm probability for the information bits;

encoding the set of information bits with a first error control code so as to create a first set of encoded bits;

encoding the first set of encoded bits with a second error control code so as to create a second set of encoded bits;

determining whether to partition either the set of information bits or the first set of encoded bits into a plurality of streams of bits;

partitioning either the set of information bits or the first set of encoded bits as a function of the desired false alarm probability;

modulating the second set of encoded bits as a plurality of beacon tones; and transmitting the plurality of beacon tones, each of the plurality of beacon tones transmitted with a corresponding beacon signal strength, each of the corresponding beacon signal strengths being higher than each of a plurality signal strengths corresponding to each of a plurality of non-beacon tones.

2. The method of claim 1, wherein partitioning either the set of information bits or the first set of encoded bits as a function of the desired false alarm probability comprises partitioning either the set of information bits or the first set of encoded bits into the plurality of streams of bits, the plurality of streams of bits including at least a first stream of bits and a second stream of bits, at least one bit in either the set of information bits or the first set of encoded bits being included in both the first stream of bits and the second stream of bits.

3. The method of claim 1, wherein at least one of encoding the first set of encoded bits with a second error control code and encoding the first set of encoded bits with a second error control code comprises executing one of a hashing algorithm and a repetition algorithm.

4. The method of claim 1, wherein the information bits relate to a control channel.

5. The method of claim 4, wherein the information bits are control bits corresponding to an interference mitigation message.

6. A hardware apparatus, comprising:

a receiving component, the receiving component configured to receive a set of control bits;

an ascertaining component, the ascertaining component configured to ascertain a desired false alarm probability for the control bits;

a first encoding component, the first encoding component configured to encode the set of control bits with a first error control code so as to create a first set of encoded bits;

a second encoding component, the second encoding component configured to encode the first set of encoded bits with a second error control code so as to create a second set of encoded bits;

a modulating component, the modulating component configured to modulate the second set of encoded bits as a plurality of beacon tones; and a transmitting component, the transmitting component configured to transmit the plurality of beacon tones, each of the plurality of beacon tones transmitted with a corresponding beacon signal strength, each of the corresponding beacon signal strengths being higher than each of a plurality of signal strengths corresponding to each of a plurality of non-beacon tones, wherein at least one of the first encoding component and second encoding component is further configured to determine whether to partition either the set of control bits or the first set of encoded bits into a plurality of streams of bits, and to partition either the set of control bits or the first set of encoded bits as a function of the desired false alarm probability.

7. The apparatus of claim 6, wherein at least one of the first or second encoding components is further configured to implement a Reed-Solomon code or a convolution code.

8. The apparatus of claim 6, wherein the at least one of the first or second encoding components is further configured to partition either the set of control bits or the first set of encoded bits so that the plurality of streams of bits includes at least a first stream of bits and a second stream of bits, and at least one bit in either the set of control bits or the first set of encoded bits is included in both the first stream of bits and the second stream of bits.

9. The apparatus of claim 6, further comprising an interleaver component configured to interleave at least one of the set of control bits, the first set of encoded bits, or the second set of encoded bits.

10. The apparatus of claim 9, wherein the interleaver component is further configured to provide at least one of a frequency or time interleaving functions.

11. At least one hardware processor configured to encode a wireless control signal, comprising:

a first module for receiving a set of control bits;

a second module for ascertaining a desired false alarm probability for the control bits;

a third module for encoding the set of control bits with a first error control code so as to create a first set of encoded bits;

a fourth module for encoding the first set of encoded bits with a second error control code so as to create a second set of encoded bits;

a fifth module for modulating the second set of encoded bits as a plurality of beacon tones; and a sixth module for transmitting the plurality of beacon tones, each of the plurality of beacon tones transmitted with a corresponding beacon signal strength, each of the corresponding beacon signal strengths being higher than each of a plurality signal strengths corresponding to each of a plurality of non-beacon tones, wherein at least one of the third module and fourth module is further for determining whether to partition either the set of control bits or the first set of encoded bits into a plurality of streams of bits, and to partition either the set of control bits or the first set of encoded bits as a function of the desired false alarm probability.

12. A computer program product, comprising:
a non-transitory computer-readable medium comprising:
  a first set of codes for causing a computer to receive a set of control bits;
  a second set of codes for causing a computer to ascertain a desired false alarm probability for the control bits;
  a third set of codes for causing the computer to encode the set of control bits with a first error control code so as to create a first set of encoded bits;
  a fourth set of codes for causing the computer to encode the first set of encoded bits with a second error control code so as to create a second set of encoded bits;
a fifth set of codes for causing the computer to modulate the second set of encoded bits as a plurality of beacon tones; and
  a sixth set of codes for causing the computer to transmit the plurality of beacon tones, each of the plurality of beacon tones transmitted with a corresponding beacon signal strength, each of the corresponding beacon signal strengths being higher than each of a plurality of signal strengths corresponding to each of a plurality of non-beacon tones,
  wherein at least one of the third and fourth set of codes is further for causing the computer to determine whether to partition either the set of control bits or the first set of encoded bits into a plurality of streams of bits, and to partition either the set of control bits or the first set of encoded bits as a function of the desired false alarm probability.

13. An apparatus, comprising:
means for receiving a set of control bits;
means for ascertaining a desired false alarm probability for the control bits;
means for encoding the set of control bits with a first error control code so as to create a first set of encoded bits;
means for encoding the first set of encoded bits with a second error control code so as to create a second set of encoded bits;
means for determining whether to partition either the set of control bits or the first set of encoded bits into a plurality of streams of bits;
means for partitioning either the set of control bits or the first set of encoded bits as a function of the desired false alarm probability;
means for modulating the second set of encoded bits as a plurality of beacon tones; and
means for transmitting the plurality of beacon tones, wherein each of the plurality of beacon tones is transmitted with a corresponding beacon signal strength, each of the corresponding beacon signal strengths being higher than each of a plurality of signal strengths corresponding to each of a plurality of non-beacon tones.

14. A method for decoding a wireless control signal, comprising:
  receiving a plurality of beacon-based control tones corresponding to a set of control bits, each of the plurality of beacon-based control tones transmitted using a concatenated code having a corresponding beacon signal strength, each of the corresponding beacon signal strengths being higher than each of a plurality of signal strengths corresponding to each of a plurality of non-beacon tones; and
  demodulating the plurality of beacon-based control tones so as to ascertain a set of decoded bits, wherein the demodulating comprises:
    demodulating the plurality of beacon-based control tones so as to ascertain a set of demodulated bits;
    decoding the set of demodulated bits with a first error control decoder so as to ascertain a first set of decoded bits; and
    decoding the first set of decoded bits with a second error control decoder so as to ascertain a second set of decoded bits, the second set of decoded bits including the set of control bits,
  wherein at least one of decoding the set of demodulated bits with a first error control decoder and decoding the first set of decoded bits with a second error control decoder comprises decoding either the set of demodulated bits or the first set of decoded bits as a function of whether a hashed version of at least one of the demodulated bits or the first set of decoded bits was received.

15. A hardware apparatus comprising:
a receiving component configured to receive a plurality of beacon-based control tones corresponding to a set of control bits, each of the plurality of beacon-based control tones having a corresponding beacon signal strength, each of the corresponding beacon signal strengths being higher than each of a plurality of signal strengths corresponding to each of a plurality of non-beacon tones;
a demodulator component configured to demodulate the plurality of beacon tones so as to ascertain a set of demodulated bits;
a first error control decoder configured to decode the set of demodulated bits according to a first error control code so as to ascertain a first set of decoded bits; and
a second error control decoder configured to decode the first set of decoded bits according to a second error control code so as to ascertain a second set of decoded bits, the second set of decoded bits including the set of control bits,
wherein at least one of the first or second error control decoders is further configured to decode either the set of demodulated bits or the first set of decoded bits, the demodulating being a function of whether a hashed version of either the demodulated bits or the first set of decoded bits was received.

16. The apparatus of claim 15, further comprising a de-interleaver component, the de interleaver component configured to de-interleave at least one of the set of demodulated bits, the first set of decoded bits, or the second set of decoded bits.

17. The apparatus of claim 15, wherein at least one of the first or second error control decoders is further configured to decode a Reed-Solomon code or a convolution code.

18. At least one hardware processor configured to decode a wireless control signal, comprising:
a first module for receiving a plurality of beacon-based control tones corresponding to a set of control bits, each of the plurality of beacon-based control tones detected as having a corresponding beacon signal strength, each of the corresponding beacon signal strengths being higher than each of a plurality of signal strengths corresponding to each of a plurality of non-beacon tones;
a second module for demodulating the plurality of beacon-based control tones so as to ascertain a set of demodulated bits;

a third module for decoding the set of demodulated bits with a first error control decoder so as to ascertain a first set of decoded bits; and a fourth module for decoding the first set of decoded bits with a second error control decoder so as to ascertain a second set of decoded bits, the second set of decoded bits including the set of control bits, wherein at least one of the third or fourth modules is further for determining whether either the set of demodulated bits or the first set of decoded bits represent a partial codeword.

19. A computer program product, comprising:

a non-transitory computer-readable medium comprising:

a first set of codes for causing a computer to receive a plurality of beacon-based control tones corresponding to a set of control bits, each of the plurality of beacon-based control tones having a corresponding beacon signal strength, each of the corresponding beacon signal strengths being higher than each of a plurality of signal strengths corresponding to each of a plurality of non-beacon tones;

a second set of codes for causing the computer to demodulate the plurality of beacon-based control tones so as to ascertain a set of demodulated bits;

a third set of codes for causing the computer to decode the set of demodulated bits according to a first error control algorithm so as to ascertain a first set of decoded bits; and a fourth set of codes for causing the computer to decode the first set of decoded bits according to a second error control algorithm so as to ascertain a second set of decoded bits, the second set of decoded bits including the set of control bits, wherein at least one of the third or fourth set of codes is further for causing the computer to determine whether either the set of demodulated bits or the first set of decoded bits represent a partial codeword.

20. An apparatus, comprising:

means for receiving a plurality of beacon-based control tones corresponding to a set of control bits, each of the plurality of beacon-based control tones having a corresponding beacon signal strength, each of the corresponding beacon signal strengths being higher than each of a plurality of signal strengths corresponding to each of a plurality of non-beacon tones;

means for demodulating the plurality of beacon-based control tones so as to ascertain a set of demodulated bits;

means for decoding the set of demodulated bits with a first error control decoder so as to ascertain a first set of decoded bits; and means for decoding the first set of decoded bits with a second error control decoder so as to ascertain a second set of decoded bits, the second set of decoded bits including the set of control bits, wherein at least one of the means for decoding the set of demodulated bits with a first error control decoder and the means for decoding the first set of decoded bits with a second error control decoder comprises means for determining whether either the set of demodulated bits or the first set of decoded bits represent a partial codeword.

* * * * *